(12) United States Patent
Lamore

(10) Patent No.: US 12,460,692 B1
(45) Date of Patent: Nov. 4, 2025

(54) FLEXIBLE TENSILE MEMBER WITH RELEASABLE CONVOLUTIONS FOR ABSORBING TENSILE ENERGY

(71) Applicant: Barrier1 Systems, LLC, Greensboro, NC (US)

(72) Inventor: Michael John Lamore, Greensboro, NC (US)

(73) Assignee: Barrier1 Systems, LLC, Greensboro, NC (US)

( * ) Notice: Subject to any disclaimer, the term of this patent is extended or adjusted under 35 U.S.C. 154(b) by 37 days.

(21) Appl. No.: 18/209,530

(22) Filed: Jun. 14, 2023

Related U.S. Application Data

(63) Continuation of application No. 17/370,254, filed on Jul. 8, 2021, now Pat. No. 11,686,363, which is a continuation of application No. 16/279,197, filed on Feb. 19, 2019, now Pat. No. 11,060,581.

(60) Provisional application No. 62/632,228, filed on Feb. 19, 2018.

(51) Int. Cl.
  *F16F 7/00* (2006.01)
  *F16F 7/12* (2006.01)

(52) U.S. Cl.
  CPC .............. *F16F 7/003* (2013.01); *F16F 7/128* (2013.01); *F16F 2226/04* (2013.01)

(58) Field of Classification Search
  CPC .. F16F 7/003; F16F 7/006; F16F 7/125; F16F 7/126; F16F 7/128; F16F 2226/04; E01F 7/045; E01F 7/04
  USPC .............. 188/371, 375, 376; 256/12.5; 114/240 E, 250 A
  See application file for complete search history.

(56) References Cited

U.S. PATENT DOCUMENTS

| | | | |
|---|---|---|---|
| 1,935,339 | A | 11/1933 | Tricau |
| 2,165,274 | A | 7/1939 | Kessenich |
| 2,352,036 | A | 6/1944 | Tauty |
| 2,474,124 | A | 6/1949 | Schultz |
| 3,307,833 | A | 3/1967 | Muller et al. |
| 3,444,962 | A | 5/1969 | Lech |
| 3,504,460 | A | 4/1970 | Solberg |
| 3,622,107 | A | 11/1971 | Bernard |
| 3,827,660 | A | 8/1974 | Doolittle |
| 3,876,170 | A | 4/1975 | Whittingham |
| 3,938,763 | A | 2/1976 | DiGiovanniantonio |
| 4,029,178 | A | 6/1977 | Tschift |
| 4,147,317 | A | 4/1979 | Mayhew et al. |
| 4,509,303 | A | 4/1985 | Randle et al. |
| 4,515,254 | A | 5/1985 | Markov et al. |
| 4,588,208 | A | 5/1986 | Yoshitsugu |

(Continued)

FOREIGN PATENT DOCUMENTS

| | | | |
|---|---|---|---|
| CN | 113339437 A | * | 9/2021 |
| DE | 1531512 A1 | | 7/1970 |

(Continued)

*Primary Examiner* — Thomas J Williams
(74) *Attorney, Agent, or Firm* — Additon, Pendleton & Witherspoon, P.A.

(57) ABSTRACT

An energy absorber includes a flexible tensile member having lengthwise sections arranged serially along a length of the flexible tensile member. Lengthwise sections define convolutions. Features are provided for both restricting straightening of the convolutions and automatically reconfiguring, in response predetermined tension in the flexible tensile member, to allow straightening of the convolutions.

20 Claims, 17 Drawing Sheets

(56) References Cited

U.S. PATENT DOCUMENTS

| | | |
|---|---|---|
| 4,603,520 A | 8/1986 | Deike |
| 5,048,863 A | 9/1991 | Henseler et al. |
| 5,071,091 A | 12/1991 | Kahn et al. |
| 5,143,187 A | 9/1992 | McQuarrie et al. |
| 5,219,241 A | 6/1993 | Picton |
| 5,332,071 A | 7/1994 | Duncan |
| 5,433,290 A | 7/1995 | Ellis et al. |
| 5,624,203 A | 4/1997 | Jackson et al. |
| 5,630,298 A | 5/1997 | Tsai et al. |
| 5,823,705 A | 10/1998 | Jackson et al. |
| 5,961,099 A | 10/1999 | Thommen, Jr. |
| 5,993,104 A | 11/1999 | Marcotullio et al. |
| 6,065,738 A | 5/2000 | Pearce et al. |
| 6,141,919 A | 11/2000 | Robinson |
| 6,254,063 B1 | 7/2001 | Rohde et al. |
| 6,394,241 B1 | 5/2002 | Desjardins et al. |
| 6,422,783 B1 | 7/2002 | Jordan |
| 6,581,875 B2 | 6/2003 | Colarik |
| 6,926,461 B1 | 8/2005 | Faller et al. |
| 6,997,637 B2 | 2/2006 | Schneider et al. |
| 7,107,751 B2 | 9/2006 | Nüesch |
| 7,357,222 B2 * | 4/2008 | Durbic ............... A62B 35/0056 188/375 |
| 7,744,313 B2 * | 6/2010 | Terai ....................... E01F 13/12 405/211 |
| 8,235,359 B2 | 8/2012 | Dyke et al. |
| 8,662,265 B2 | 3/2014 | Humfeldt et al. |
| 8,757,597 B2 | 6/2014 | James |
| 9,243,375 B2 | 1/2016 | James |
| 9,441,337 B2 | 9/2016 | Lamore |
| 9,476,276 B2 | 10/2016 | Wells et al. |
| 9,791,245 B1 | 10/2017 | Lamore |
| 11,060,581 B1 | 7/2021 | Lamore |
| 11,686,363 B1 | 6/2023 | Lamore |
| 2002/0085880 A1 * | 7/2002 | Schneider ............. E01F 15/146 404/6 |
| 2003/0016996 A1 | 1/2003 | Gelfand et al. |
| 2011/0094839 A1 | 4/2011 | Blomberg et al. |

FOREIGN PATENT DOCUMENTS

| | | | |
|---|---|---|---|
| EP | 0415962 B1 | 8/1993 | |
| EP | 1156158 A1 * | 11/2001 | ............. E01F 7/045 |
| EP | 1302595 A1 | 4/2003 | |
| FR | 2539477 A1 | 7/1984 | |
| FR | 2899252 A1 * | 10/2007 | ............. E01F 7/045 |
| KR | 101367163 B1 * | 2/2014 | ............... E01F 7/04 |
| WO | 1992/002688 A1 | 2/1992 | |

\* cited by examiner

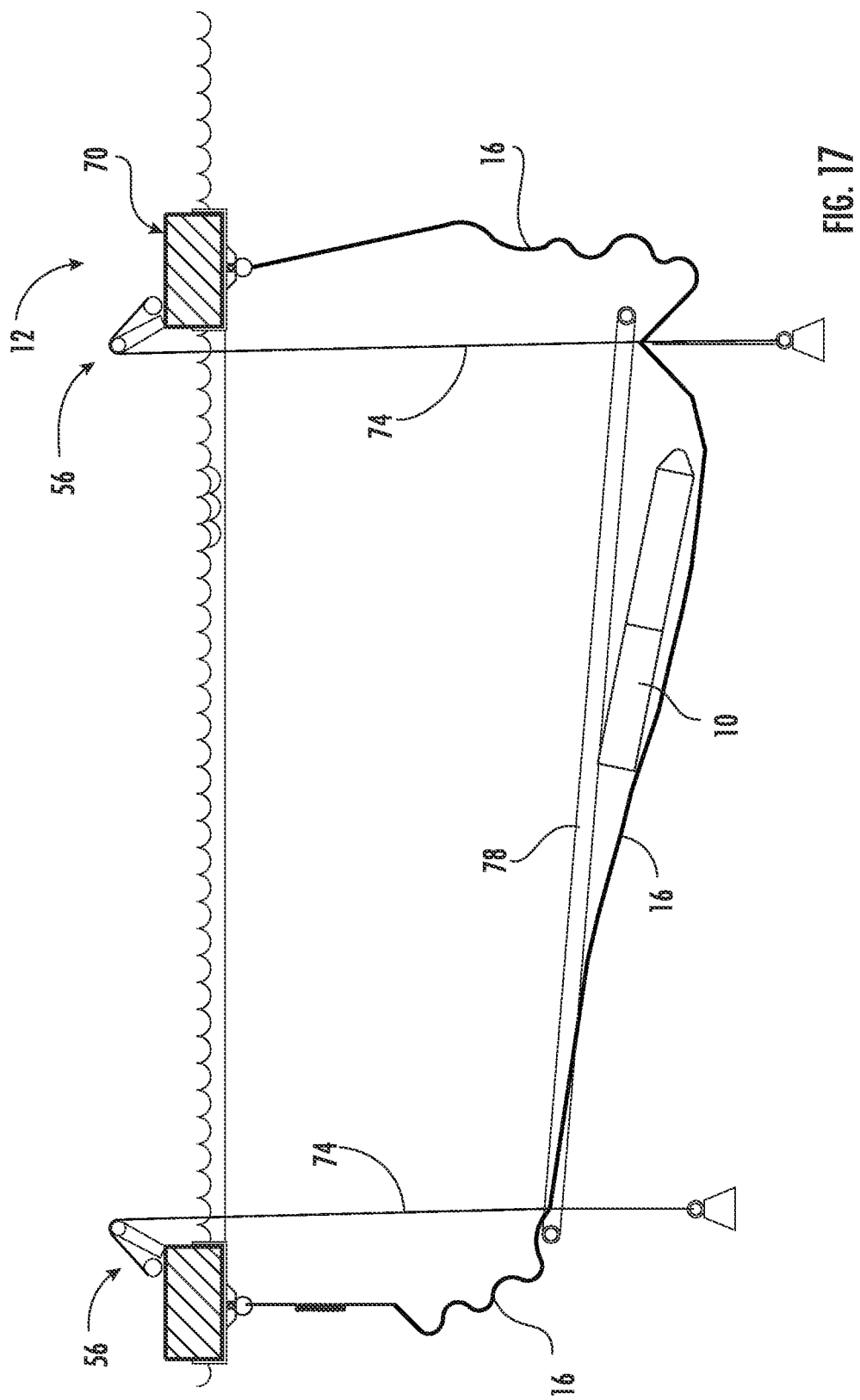

FLEXIBLE TENSILE MEMBER WITH RELEASABLE CONVOLUTIONS FOR ABSORBING TENSILE ENERGY

CROSS-REFERENCE TO PRIORITY APPLICATIONS

This application is a continuation of U.S. patent application Ser. No. 17/370,254 filed Jul. 8, 2021, which is a continuation of U.S. patent application Ser. No. 16/279,197 filed Feb. 19, 2019, which claims the benefit of U.S. Provisional Application Ser. No. 62/632,228 filed Feb. 19, 2018. Each of the foregoing patent applications is hereby incorporated by reference in its entirety.

FIELD OF THE INVENTION

The present invention relates generally to energy absorbing systems, including energy absorbing cable systems that arrest moving objects, such as vehicles and projectiles.

BACKGROUND

Various energy absorbing systems have been used to arrest moving objects, such as vehicles, such as motor vehicles, marine vessels, boats, and planes, and projectiles. Except for systems used on aircraft carriers to stop jets when landing, it is believed that these systems typically stop the vehicle so quickly that the vehicle can be damaged, and any occupants or other contents can be injured because the vehicle and its occupants and/or contents experience too much force while they are being arrested. Often, because of location and other considerations, the energy absorbing systems have size and space constraints regarding foundations, connections, and associated components. For example, some energy absorbing systems installed across roadways at sensitive installations, can stop a smaller vehicle such as a car traveling at a relatively low rate of speed, so that the car is not significantly damaged, and the car's passengers are not injured. However, the same system may be unable to stop a heavy truck traveling at a higher speed. Fatal accidents have occurred for many years because vehicles, trains, and planes have been unable to stop before colliding into other objects. Thus, there is a need for a system that can slow or stop moving objects, such as vehicles before they collide with other objects and without causing damage to the moving objects and any passengers and/or other contents.

SUMMARY

In one aspect of this disclosure, an energy absorbing system includes a flexible tensile member (e.g., a cable, chain, and/or strap) that is configured to absorb energy from a moving object in a cyclical manner so that the flexible tensile member experiences a first increase in tension, a first decrease in tension, and a second increase in tension during the time that the moving object is decelerated (e.g., during the time that the moving object straightens the flexible tensile member).

In an example, the flexible tensile member has a predetermined length and includes one or more folded portions (e.g., convolute portions) wherein each folded portion is retained in its folded configuration using at least one energy-absorbing connector having a predetermined strength (e.g., yield strength and/or breaking strength) so that when the energy-absorbing connector fails at the predetermined strength, the folded portion of the flexible tensile member opens (e.g., at least partially unfolds), and the effective length of the flexible tensile member increases (e.g., at least generally in the direction of travel of the moving object).

In another example, a method of absorbing energy from a moving object includes providing at least one flexible tensile member having first and second opposed end sections, and having at least one folded flexible tensile member portion, and an energy-absorbing connector holding together the at least one folded flexible tensile member portion; attaching the first flexible tensile member end section to a fixed structure; attaching the second flexible tensile member end section to an engaging device (e.g., an arrestor that can be in the form of a net or other suitable structure); and the engaging device being in the path of the moving object (e.g., placing the engaging device in the path of the moving object).

Another aspect of this disclosure is the provision of an energy absorbing flexible tensile member system that includes at least one energy absorbing flexible tensile member and an engaging device that is configured to engage a moving object having a predetermined size and/or shape.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings are provided as examples, and they are typically schematic and may not be drawn to scale. The present invention may be embodied in many different forms and should not be construed as limited to the examples depicted in the drawings.

FIG. 15 is a partially sectioned side view of an arrestor system of the second embodiment, including the barge of FIG. 13.

FIG. 17 depicts the net of the arrestor system of FIG. 16 being raised with the projectile.

DETAILED DESCRIPTION

Examples of embodiments are disclosed in the following. The present invention may, however, be embodied in many different forms and should not be construed as limited to the embodiments set forth herein. For example, features disclosed as part of one embodiment or example can be used in the context of another embodiment or example to yield a further embodiment or example. As another example of the breadth of this disclosure, it is within the scope of this disclosure for one or more of the terms "substantially," "about," "approximately," and/or the like, to qualify each of the adjectives and adverbs of the Detailed Description section of disclosure, as discussed in greater detail below. Like numbers refer to like elements throughout.

Figure 1:
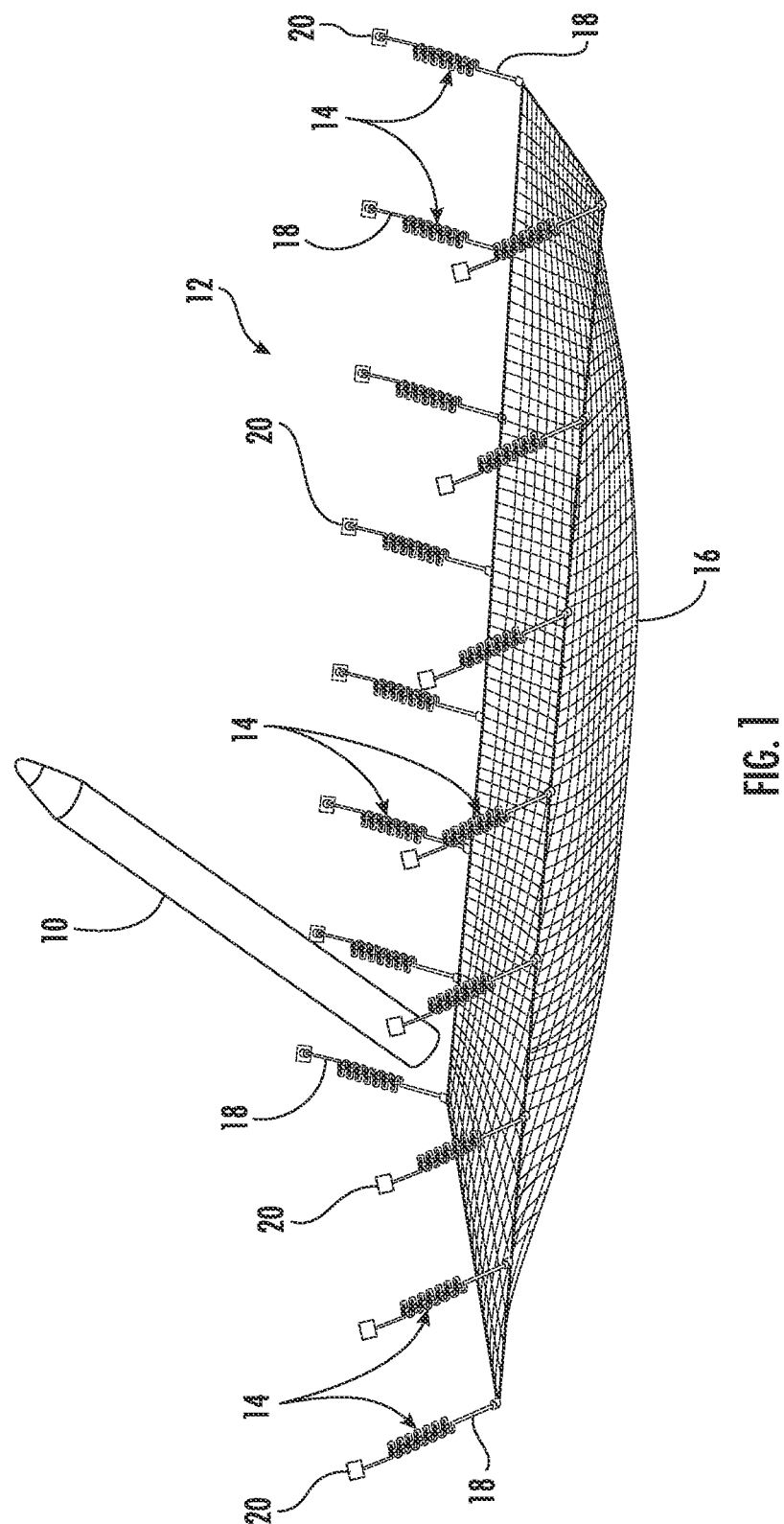
FIG. 1 is a side perspective view depicting a projectile falling toward an arrestor system configured for gradually arresting movement of the projectile (e.g., missile), in accordance with a first embodiment of this disclosure.
Figure 2:
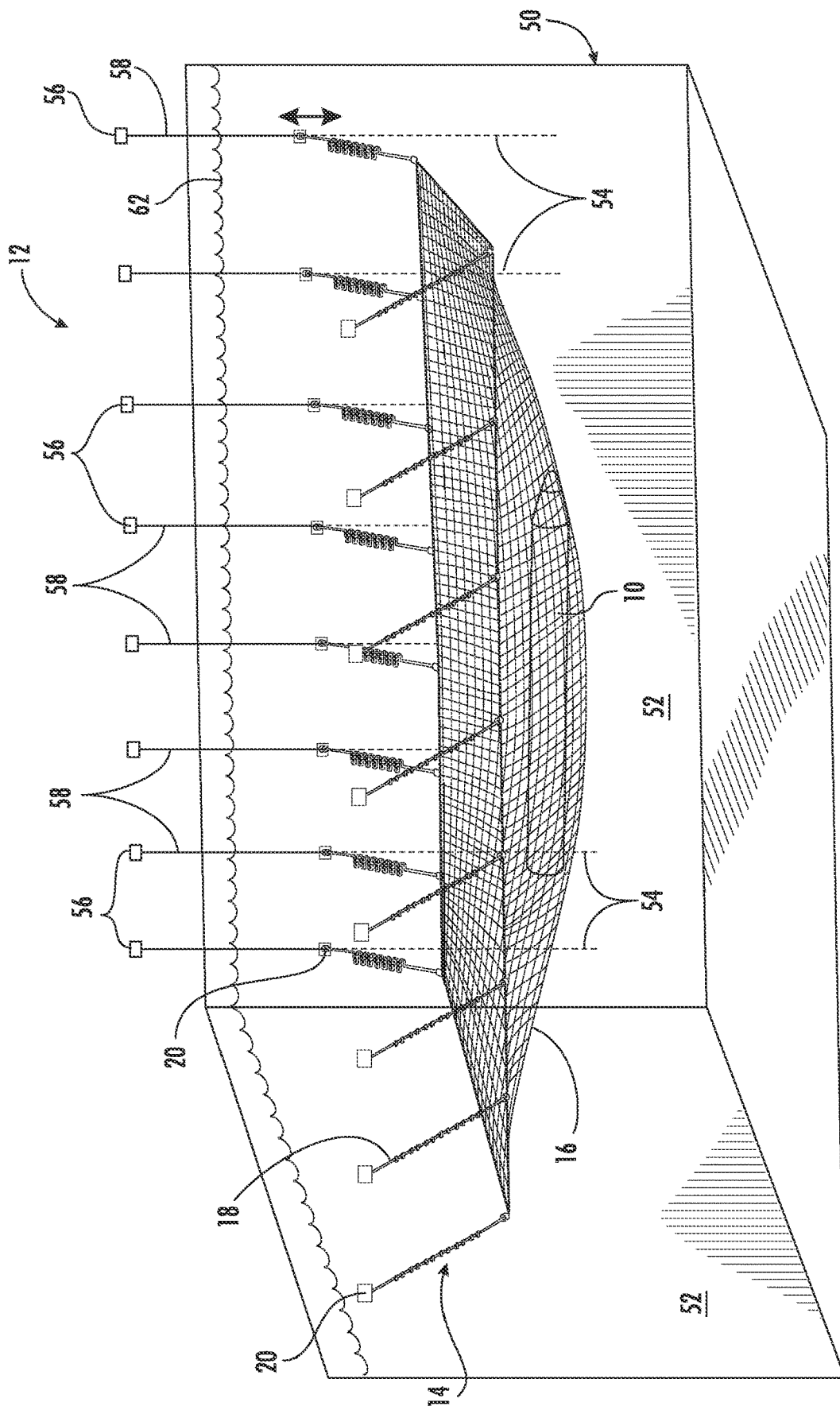
FIG. 2 depicts the arrestor system of FIG. 1 gently catching/relatively slowly decelerating the projectile.

FIG. 1 depicts a projectile 10 (e.g., an object or vehicle in the form of a missile) falling toward an arrestor system 12 configured to gradually decelerate the projectile, and FIG. 2 depicts the arrestor system gently catching, or having gently caught, the projectile, in accordance with a first embodiment of this disclosure. The first embodiment arrester system 12 is configured so that movement of the projectile 10 (the missile or other suitable object) is gradually arrested by gradually decelerating the projectile, rather than the projectile being abruptly arrested by abrupt deceleration. For example, the arrestor system 12 is configured to allow the projectile's kinetic energy to be dissipated gradually in a controlled manner that seeks to avoid damaging the projectile 10 and its contents. For example, the projectile 10 may contain expensive equipment that would be adversely effected by any excessively rapid deceleration, and the arrestor system 12 operates in a manner that seeks to avoid any such excessively rapid deceleration. As will be discussed in greater detail below, features of the system 12 can be adjusted for dissipating a wide range of amounts of kinetic energy, for example exceeding 100,000 ft-lbs, exceeding 200,000 ft-lbs, and/or exceeding 1,500,000 ft-lbs. Lesser and greater amounts of kinetic energy are within the scope of this disclosure.

In FIGS. 1 and 2, the arrestor system 12 includes a series of elongate, tensile energy absorbers 14 (e.g., energy absorbing cables) supporting a wide, flexible engaging device in the form of a net 16. Each energy absorber 14 includes an elongate, flexible tensile member 18 (e.g., a cable, chain, strap, and/or the like) having an upper end section fixedly connected to an anchoring feature 20 of one or more support structures, and a lower end section fixedly connected to an outer marginal portion of (e.g., the periphery of) the net 16. Each flexible tensile member 18 can be a continuous flexible tensile member or can be made of segments of flexible tensile members. Each flexible tensile member 18 can be made of a strip of material or can be made of segments of strips of material. Each flexible tensile 18 may have a circular cross-section, but is not required to have a circular cross-section.

In FIG. 1, each of the energy absorbers 14 is in its bound or contracted configuration in which respective lengthwise sections of its flexible tensile member 18 are being retained in convolute (e.g., folded, doubled over, bent, and/or the like) configurations, so that the energy absorber 14 is capable of absorbing tensile energy over a period of time (e.g., believed to be a few seconds), as will be discussed in greater detail below. Similarly, in FIG. 2, each of the energy absorbers 14 connected to the far side of the net 16 is in its bound or contracted configuration in which respective lengthwise sections of its flexible tensile member 18 are being retained in convolute configurations. In contrast, in FIG. 2, each of the energy absorbers 14 in the forefront of the drawing is in its fully extended configuration in which the previously existing convolutions in the respective lengthwise sections of its flexible tensile member 18 have been straightened as part of the energy absorber having absorbed a predetermined about of tensile energy while arresting movement of the projectile 10, as will be discussed in greater detail below.

Figure 3:
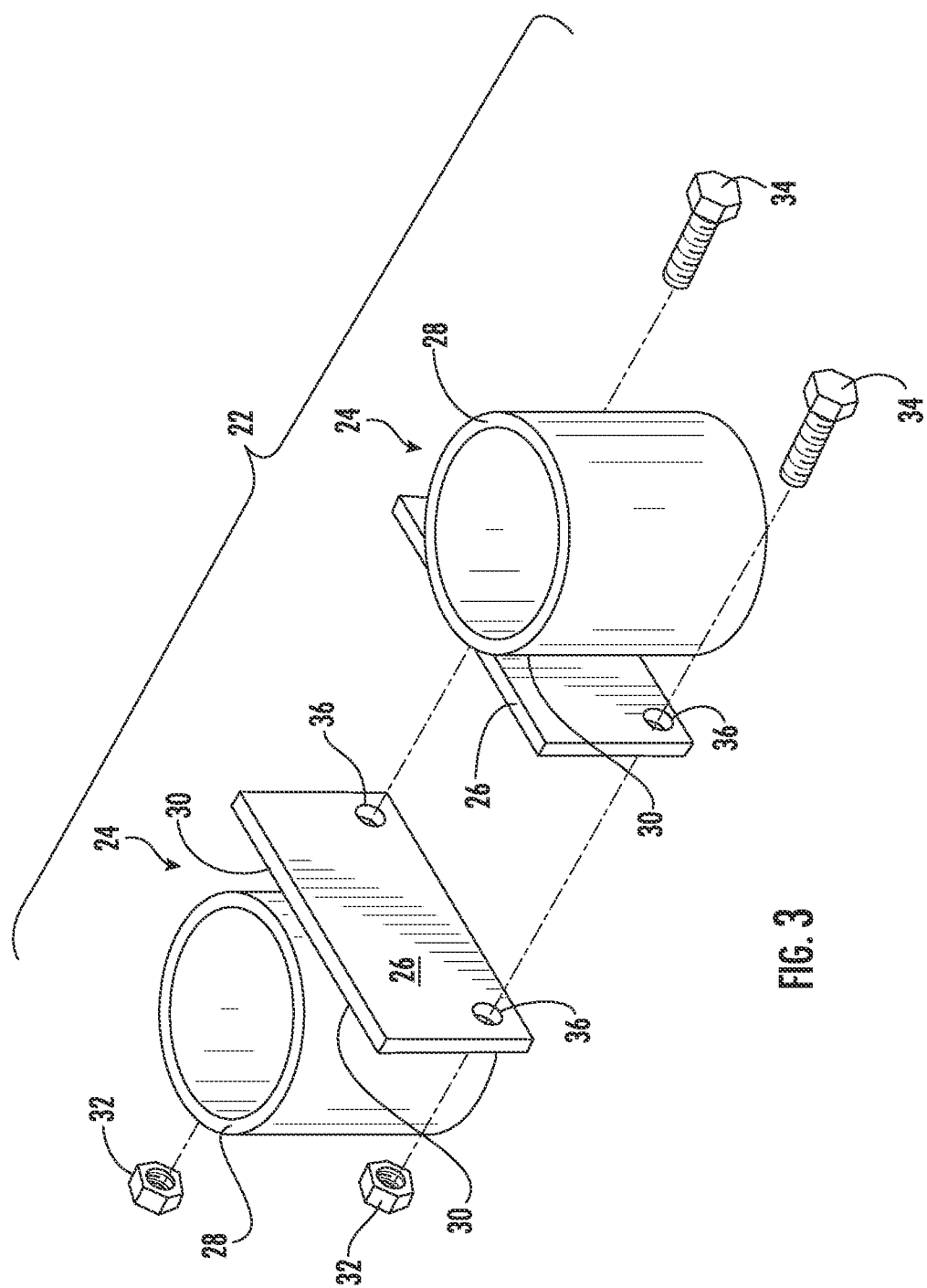
FIG. 3 is an isolated, exploded view of one of several energy-absorbing connectors of an energy absorber of the system of FIGS. 1 and 2.

FIG. 3 is an isolated, exploded view of an energy-absorbing connector 22 that can be used to retain a lengthwise section of a flexible tensile member 18 ("tensile member section") in a convolute configuration. In the first embodiment, each respective tensile member section of a bound or contracted energy absorber 14 is retained in its convolute configuration by a respective one of the energy-absorbing connectors 22. Differently configured energy-absorbing connector 22, and different combinations of different energy-absorbing connectors in the same energy absorber 14, can be used, as will be discussed in greater detail below.

In the example depicted in FIG. 3, the energy-absorbing connector 22 includes a pair of brackets 24. Each of the first embodiment brackets 24 includes a base 26 that is fixedly connected to a guide 28 (e.g., channel, tube, or other suitable structure) defining an opening, hole, or passageway configured for receiving a respective tensile member section and controlling the orientation of tensile member section. In the first embodiment, the base 26 is a substantially flat base plate 26, and the guide 28 is a guide tube 28 that is fixedly connected to the base plate by one or more weld beads 30 and/or other suitable fasteners. The guide tube 28 may be circular or cylindrical, but it is not required to be circular or cylindrical. The energy-absorbing connector 22, or each of the brackets 24, may be initially formed in a single piece.

In the first embodiment, a fully assembled connector 22 includes one or more fasteners connecting the brackets 24 to one another. In the example depicted in FIG. 3, the fasteners include male and female fastener parts in the form of nuts 32 and bolts 34, wherein the bolts extend through superposed holes 36 respectively in the base plates 26. Additionally or alternatively, the fastener(s) connecting the brackets 24 to one another can be rivets, screws, pins, clips, welds, ties, and/or any other suitable fasteners typically having predetermined strength (e.g., yield strength and/or breaking strength). The fasteners can be made of materials such as metal or plastic or other materials that have a predetermined tensile strength. The brackets 24 may also be connected using an adhesive and/or welding.

Figure 4:
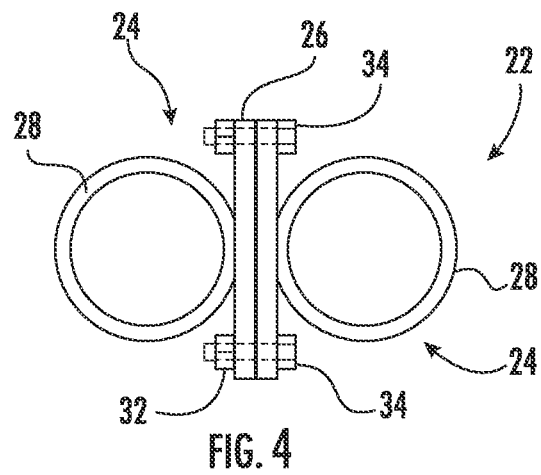
FIG. 4 is a top view of the energy-absorbing connector of FIG. 3 in an assembled configuration.
Figure 5:
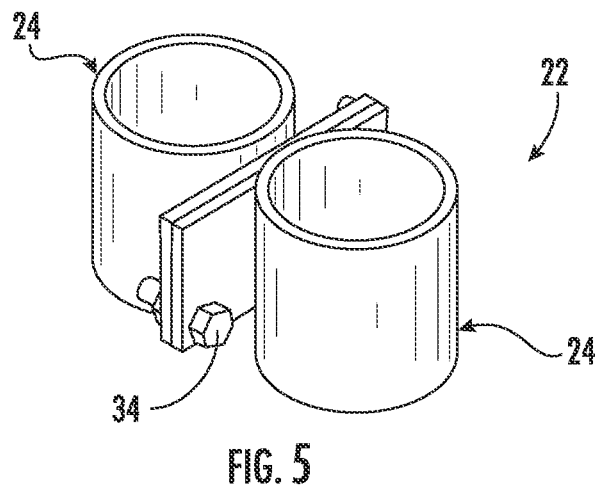
FIG. 5 is a perspective view of the energy-absorbing connector of FIG. 4.
Figure 6:
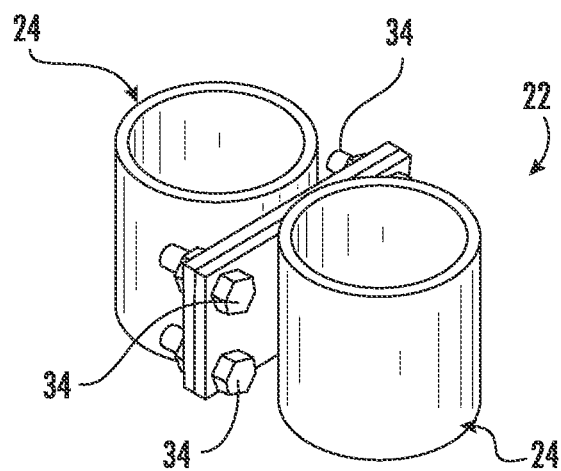
FIG. 6 is a perspective view of the energy-absorbing connector of FIG. 4 with additional fasteners.

FIGS. 4 and 5 depict the energy-absorbing connector 22 in its assembled configuration. FIG. 6 depicts that the connector 22 can include an increased number of fasteners 32, 34. The connectors 22 can be held together with different numbers and/or different types of fasteners. As another example, each energy-absorbing connector 22 may be initially formed in a single piece, as discussed in greater detail below.

Figure 7:
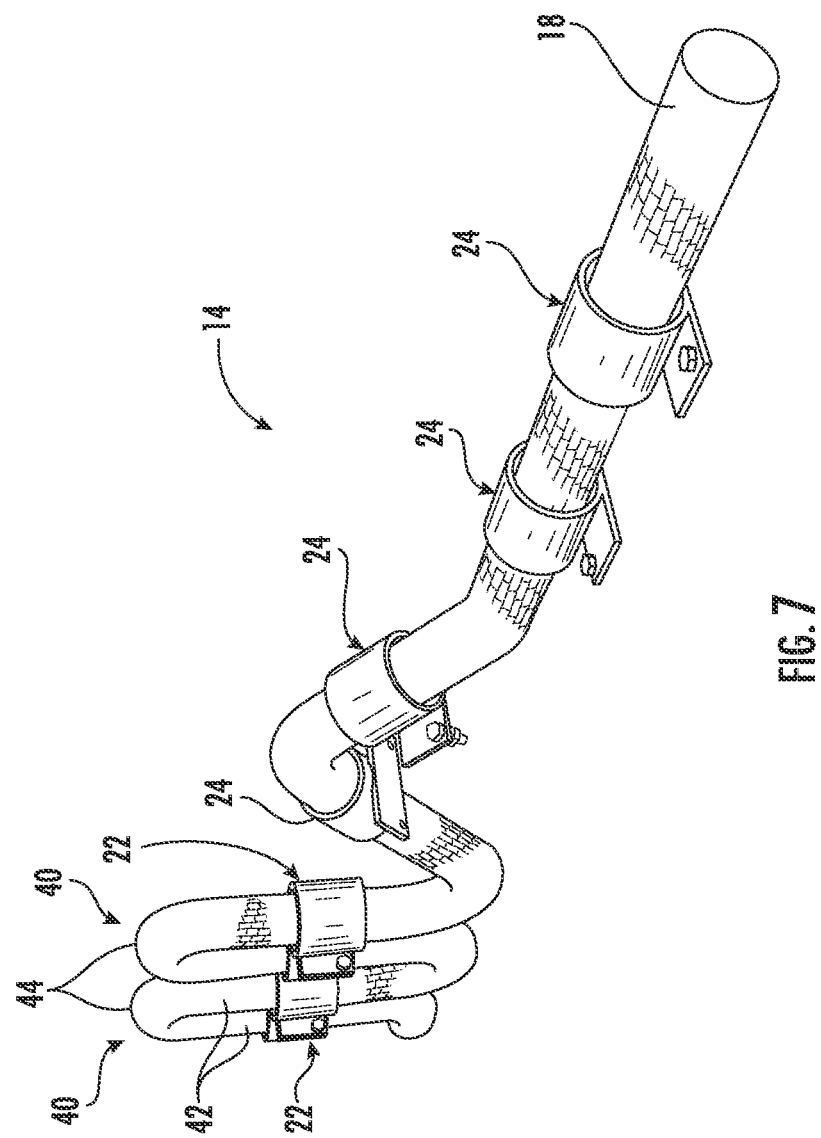
FIG. 7 is a pictorial view of a portion of an energy absorber of FIG. 1, wherein the energy absorber includes a plurality of energy-absorbing connectors, each of which includes a pair of brackets, and in FIG. 7 some of the brackets are connected and some are separated, in accordance with the first embodiment of this disclosure.

FIG. 7 depicts a section of a representative energy absorber 14 (e.g., energy absorbing cables) with respective portions in the contracted and extended configurations. FIG. 7 can be described as depicting the energy absorber 14 in the process of being further extended (as during use) or further contracted (as during assembly).

In the first embodiment, the energy absorber 14 is configured to absorb energy from a moving object (e.g., a projectile 10 in the form of a missile) in a cyclical manner so that the elongate, flexible tensile member 18 (e.g., cable) experiences a first increase in tension, a first decrease in tension, and a second increase in tension during the time that the moving object imparts tension on (e.g., pulls on) the flexible tensile member.

Figure 8:
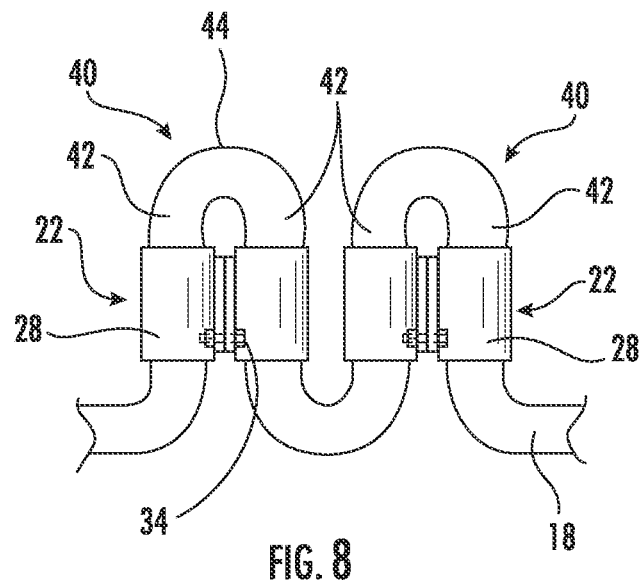
FIG. 8 is a side view of a portion of the energy absorber of FIG. 7.

The flexible tensile member 18 has a predetermined length and includes one or more convolutions. As best understood with reference to FIGS. 7 and 8, in the first embodiment, at least some of or each of the convolutions are folded portions 40 of the flexible tensile member 18, and each folded portion comprises, consist essentially of, or consists of a pair of opposite appendages 42 extending from a tip, axis, crown or bend 44 of the folded portion. Each folded portion 40 can be formed from a lengthwise section of the flexible tensile member having a central section between opposite end sections of the lengthwise section, wherein the central section forms the bend 44 and the end sections of the lengthwise section form the appendages 42. In each convolution or fold 40, its appendages 42 can respectively extend into and through the openings of the guide tubes 28 of a respective connector 22, so the appendages 42 are held adjacent to one another by the connector 22.

The folded portions 40 can be formed by bending the flexible tensile member 18 and/or by passing the flexible tensile member through the guide tubes 28 of the connectors 22. The flexible tensile member 18 can be inserted through the guide tubes 28 of separate brackets 24, then the brackets can be placed at predetermined locations on the flexible tensile member before folding the flexible tensile member and joining pairs of brackets together using the fasteners 32, 34 or other suitable joining feature(s).

The connectors 22, or the parts of the connectors 22, can be made of metal, plastic, or other material capable of holding the folded portions 40. The flexible tensile member 18 can be routed through the connector channels or tubes 28. Fasteners 32, 34 can connect the two connector brackets 24. In the first embodiment, the strength of base plate 24, tube 28, and connection therebetween is typically greater than force required to break the fastener 32, 34, so that the connector brackets 24 are re-usable and are re-connected with new fasteners after being used in a cycle of operation of the arrestor system 12.

In the first embodiment, for every other folded portion 40 along the length of the flexible tensile member 18, the fold appendages 42 are joined together using at least one energy-absorbing connector 22 having a predetermined strength (e.g., yield strength and/or breaking strength) so that when the energy-absorbing connector fails at the predetermined strength, the folded portion of the flexible tensile member opens (e.g., unfolds, unbends, straightens, or the like), and the flexible tensile member lengthens (e.g., at least generally in the direction of travel of the moving object 10). In the first embodiment, each energy-absorbing connector 22 is mounted to a convolute lengthwise section (e.g., folded portion 40) of the flexible tensile member 18, and the connector 22 is configured to both: restrict straightening of the convolution (e.g., folded portion 40), and automatically reconfigure (e.g., break apart at the fasteners 32, 34) in response to predetermined tension in the flexible tensile member to allow straightening of the respective lengthwise section of the flexible tensile member 18.

In the first embodiment, the reconfiguring (e.g., breaking of one or more features of the connector 22) can occur when the tension in the flexible tensile member 18 reaches a predetermined amount that is less than the tensile yield strength of the flexible tensile member, so that the flexible tensile member 18 substantially does not elongate. In an example of using an energy absorber 14 in which the tension in the flexible tensile member 18 does not reach the tensile yield strength of the flexible tensile member, the flexible tensile member 18 of the energy absorber 14 can be reused multiple times, by reconnecting respective brackets 24 to one another (e.g., replacing broken or otherwise strained fasteners 32, 34).

The one or more fasteners 32, 34 can be made of a material and have a predetermined size, diameter and tensile strength to achieve (e.g., establish) the desired energy or force required to break the fastener(s) to absorb energy and allow the associated folded portion 40 to open. In this regard and reiterating from above, each energy-absorbing connector 22 can be configured to both: restrict straightening of the convolution (e.g., folded portion 40), and automatically reconfigure (e.g., break apart at the fasteners 32, 34) in response to predetermined tension in the flexible tensile member to allow straightening of the respective lengthwise section of the flexible tensile member 18.

The connectors 22 or other suitable features can be configured to retain the broken fastener parts (e.g., as the fasteners 32, 34 break) to prevent small projectiles from being ejected. The connector 22 can be reusable if new fasteners 32, 34 can be installed or adhesive and/or welding can be applied to re-connect or rejoin the brackets 24 of the connector. The folded portions 40 can have a predetermined length. The folded portions 40 of an energy absorber 14 can have the same lengths or different lengths. Typically, the folded portions 40 of an energy absorber 14 will have the same lengths.

The energy absorber 14 absorbs energy in response to a tensile force being applied to the flexible tensile member 18. If the flexible tensile member 18 has two or more folded portions 40, the folded portions can be the same width and/or length or can be a different width and/or length. The opposite appendages 42 of folded portions 40 can be joined by connectors 22 with fasteners 32, 34, such as bolts, having the same or different sizes and/or strengths (e.g., yield strength and/or breaking strength). A plurality of folded portions 40 of predetermined lengths can be provided in the flexible tensile member 18 to provide a predetermined length to which the flexible tensile member can extend after being pulled by a moving object 10 having sufficient energy to break each of the plurality of connectors 22.

For each folded portion 40 that is secured by a connector 22, a predetermined size and/or strength (e.g., yield strength and/or breaking strength) of the fasteners 32, 34 connecting the connector 22 to the folded portion is determined so that the energy absorber 14 can absorb a predetermined amount of energy. When the moving object 10 provides a tensile force on the flexible tensile member 18 that equals the force required to break the fastener or fasteners 32, 34 of a connector 22, the connector 22 automatically reconfigures (e.g., its brackets 24 separate from one another) to release the associated folded portion 40 so that it extends (e.g., unfolds, unbends, or straightens) thereby lengthening the flexible tensile member relative to the fixed end of the flexible tensile member. The maximum tension force realized at any time on the flexible tensile member 18 experiencing tension forces from the object 10 can be reduced to, or approximately be, the force required to break the fasteners 32, 34 joining the connectors.

When the flexible tensile member 18 includes two or more folded portions 40, the fasteners 32, 34 of respective connectors 22 can fail sequentially, such as one at a time. After the fastener(s) 32, 34 break and energy is, thus, absorbed, the associated flexible tensile member convolution 40 is released and the tension force on the flexible tensile member decreases until the released folded portion 40 of the flexible tensile member fully extends. When the released folded portion 40 of the flexible tensile member 18 fully extends, any tension force on the flexible tensile member can increase the tension on the flexible tensile member until another connector 22 breaks (e.g., the fastener(s) 32, 34 of the connector break).

After the one or more fasteners 32, 34 of a connector 22 fail, the associated folded portion 40 extends and the tensile force on the flexible tensile member 18 decreases. After the released folded portion 40 opens completely, tensile force on the flexible tensile member 18 increases to the tensile force sufficient to break the one or more fasteners 32, 34 of a connector 22 connecting another folded portion. After the next fastener 32, 34 or fasteners 32, 34 connecting another connector 22 of another folded portion 40 fail, the folded portion opens and tension forces on the flexible tensile member 18 decreases. After the subject folded portion 40 opens completely, the tensile force on the flexible tensile member 18 increases to the tensile force sufficient to break the fastener 32, 34 or fasteners 32, 34 connecting another connector 22 of another folded portion 40. This cycle of decreasing and increasing tensile force on the flexible tensile member 18 continues until several or each of the connectors 22 are opened by failure of the one or more fasteners 32, 34 connecting the connectors 22.

As an example, when the last fastener 32, 34 or fasteners 32, 34 break so that the last folded portion 40 on the flexible tensile member 18 opens, the flexible tensile member extends to its total length, including any length resulting from stretching, and the moving object 10 is stopped, i.e. kinetic energy of the moving object is absorbed by the flexible tensile member 18 or flexible tensile members 18. As another example, an energy absorber 14 can be designed to include excess energy-absorbing capacity so that, in use, only some of its connectors 22 reconfigure to absorb energy and release a respective fold 40.

Using one or more flexible tensile members 18 with one or more folded portions 40 held in place by connectors 22 joined together or formed together, a moving object 10 can be stopped in a predetermined distance and/or a predetermined time. A moving object 10 can be stopped so that the moving object experiences a predetermined deceleration force that can minimize damage to the moving object 10 and minimize injury to any occupants and/or other contents. One or more components (e.g., brackets 24) of connectors 22 can be joined by fasteners 32, 34, adhesive, welding, soldering, magnets, electro-magnets, crimping, and/or other suitable techniques, or connectors 22 can be molded or otherwise formed as one-piece.

The fasteners 32, 34 respectively joining the brackets 24 of the connectors 22 to form the folded portions 40 can have a diameter of at least 0.0625 inches, 0.1 inches, or 1.0 inch to absorb a predetermined amount of energy for each connector. Adjacent connectors 22 can utilize different sizes and/or types of fasteners 32, 34 so that more or less energy absorption is achieved when disconnecting respective binding brackets 24 from one another. An energy absorber 14 can provide a substantially consistent absorption of energy over time by using the same types of brackets 24 and fasteners 32, 34. Alternatively, an energy absorber 14 can provide a changing absorption of energy over time by using different types of brackets 24 and fasteners 32, 34. The plurality of folded portions 40 and connectors 22 are respectively adjacent in series along the flexible tensile member 18.

The length of the folded portions 40 can be based on the total energy of the moving object 10 to be absorbed, the distance available to stop the moving object, the strength of the flexible tensile member 18, and/or the strength of the fasteners 32, 34 used to hold the folded portions together. For example, the length of the folded portions can be between 1 inch and 10 inches, or 20 inches, or 30 inches, or 40 inches or 50 inches or 60 inches to achieve (e.g., establish) the desired flexible tensile member displacement when the connector 22 releases, such as when the fasteners 32, 34 fail. The flexible tensile member 18 can be made of a strong pliable material (e.g. Kevlar, nylon, polyester, etc.) to allow the flexible tensile member to form the folded portions 40 and/or to allow the connectors 22 to be placed on the flexible tensile member. However, the flexible tensile member can also be made of steel or other metals. Depending upon the pliability and stiffness of the flexible tensile member 18, the convolutions may be configured differently than the folded portions 40 depicted in the drawings, for example by being less sharply bent and more rounded, or the like.

The flexible tensile member diameter can be any suitable size (e.g., at least 0.25 inches, 0.5 inches, 0.75 inches, 1.0 inches, 2.0 inches, 3.0 inches or greater) that is capable of stopping a moving object 10 of a predetermined mass and velocity. An outer protective flexible sleeve (not shown) can fit tightly around the flexible tensile member 18 and extend along substantially the entire length of the flexible tensile member. The inner diameters of the guide tubes 28 may be at least slightly larger than the outer diameter of the flexible tensile member 18, for example to facilitate positioning the brackets 24 along the length of the flexible tensile member 18 and/or to facilitate the guiding of the flexible tensile member through the guide tubes 28.

Figure 9:
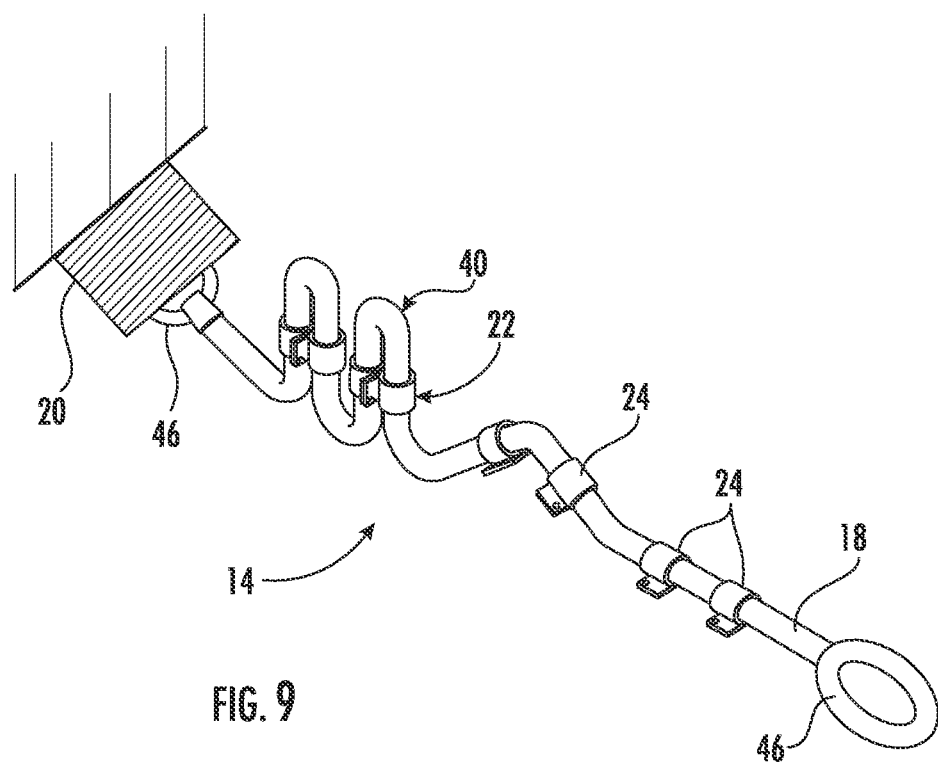
FIG. 9 is a perspective view of an energy absorber of FIG. 1 as tension is applied to an unfixed end of the cable.

Referring to FIG. 9, opposite end sections of the first embodiment flexible tensile members 18 each include end terminals 46 (e.g., can include loops, eyelets, shackles, or other devices) that are configured to allow quick connect or disconnect from respective structure. That is, ends of the flexible tensile members 18 can include loops, eyelets, pins, shackles, and other devices configured to attach the flexible tensile member ends to respective structures. In FIG. 9, one of the ends of the flexible tensile member 18 is attached to an anchoring feature 20 by way of a respective end terminal

46. For example, the anchoring feature 20 can be a metal structure attached to a concrete foundation.

Figures 10, 11:
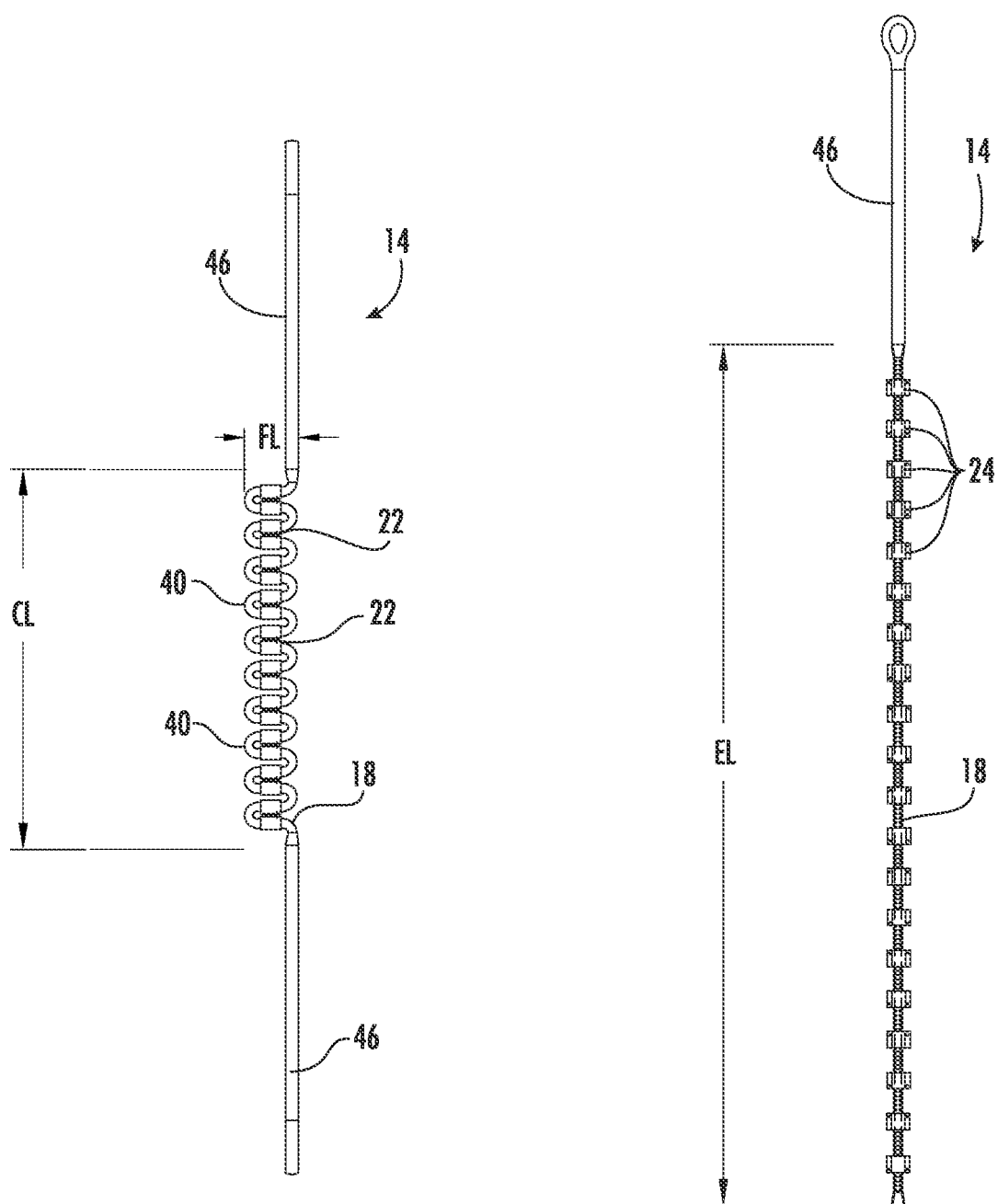
FIG. 10 is an isolated view of the energy absorber of FIG. 9 in its bound or contracted configuration.
FIG. 11 is an isolated view of the energy absorber of FIG. 10 in its fully extended configuration.

FIGS. 10 and 11 depict examples of end terminals 46 in the form of elongate ferrules, wherein lugs with eyelets extend from outer ends of the ferrules. The end sections of the flexible tensile member 18 respectively extend into and are fixedly secured in the interior of the ferrules by crimping, swaging, or otherwise deforming the ferrule to permanently tighten it onto the end sections.

FIGS. 10 and 11 depict the same absorber 14 in its contracted and extended configurations, respectively. In the example depicted in FIG. 10, the flexible tensile member 18 is a cable having a diameter of about 1.125 inches, the folds or convolutions 40 have a length FL (FIG. 10) of about 18 inches, and the plurality of folds or convolutions has a length CL (FIG. 10) of about 54 inches, so that the distance between the inner ends of the ferrule terminals 46 is about 54 inches. In contrast, in the example depicted in FIG. 11, the distance EL (FIG. 11) between the inner ends of the ferrule terminals 46 is about 16 feet. As further examples, for each of the dimensional values indicated above for FIGS. 10 and 11, the dimension value can be within a range of plus or minus 10 percent, plus or minus 20 percent, plus or minus 30 percent, or plus or minus 40 percent of the above-indicated dimensional value. The distance that the object 10 travels after impacting the arrestor system 12 can be limited to about the difference between the distance or length CL (FIG. 10) and the distance or length EL (FIG. 11).

At least partially reiterating from above, when sufficient tension force is applied to the flexible tensile member 18, fasteners 32, 34 break and release the folded portions 40 so that they unfold, unbend, and straighten. In the first embodiment, when a connector's one or more fasteners 32, 34 break, the brackets 24 of the connector separate but remain connected to (e.g., loosely connected to) the flexible tensile member 18. For example, the brackets 24 can remain connected because the openings through the bracket tubes 28 can have a crosswise dimension that is smaller than a crosswise dimension of the end terminals 46.

Figure 12:
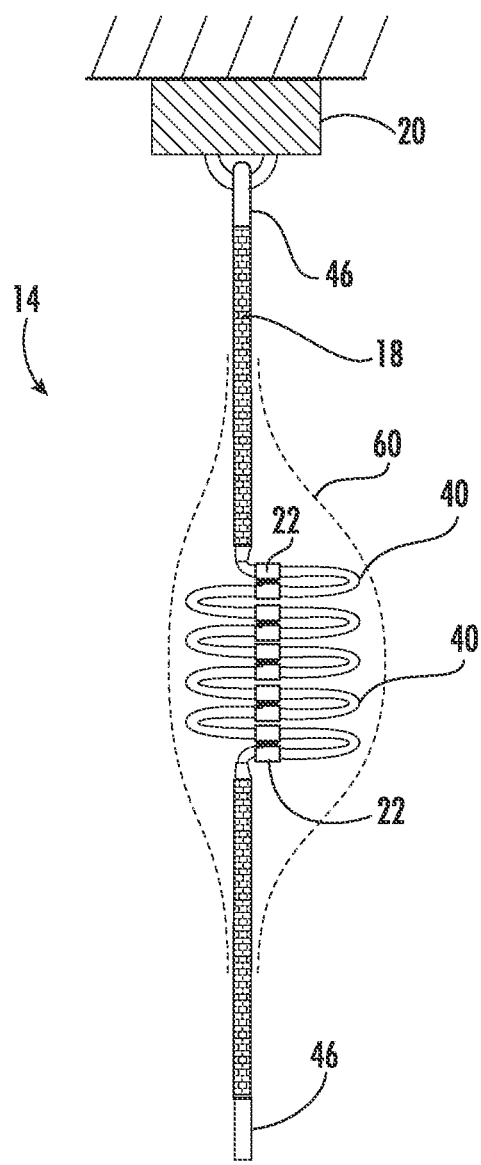
FIG. 12 depicts a variation of the energy absorber of FIG. 10.

FIG. 12 depicts an example of an energy absorber 14 with a reduced number of folded portions 40, and the folded portions having increased length, as compared to FIG. 10. In this regard, it is within the scope of this disclosure for the various features of the energy absorbers 14 to be adjustable (e.g., "tunable") for adjusting their operational characteristics.

As schematically depicted with dashed lines in FIG. 12, the flexible tensile member 18 can extend through a flexible sleeve 60. The sleeve 60 can having a length and define an elongate interior space. The length of the energy absorber 14 can extend within the sleeve 60 and along the length of the sleeve. The fasteners 32, 34 may fragment when breaking to release the folded portions 40. The sleeve 60 can be configured to substantially or at least partially retain substantially all of or at least some of the fastener fragments in the interior space of the sleeve. The sleeve 60 may be formed from a mesh material formed of strong pliable material (e.g. Kevlar, nylon, polyester, etc.)

Referring back to FIGS. 1 and 2, a plurality of the energy absorbers 14 may be included in the arrestor system 12, including a plurality of the energy absorbers on both sides of the arrestor net 16. For example, an energy absorber 14 can be attached, either directly or indirectly, to each corner of the arrestor net 16 or anywhere along each or opposite sides of the arrestor net or at any location along the perimeter of the arrestor net. The net 16 can be concave along both its length and its width.

Referring to FIG. 2, the net 16 can be suspended within the upwardly open cavity of a reinforced concrete or other suitable pit 50 having upright walls 52, two of which are omitted in FIG. 2 for ease of providing the drawing. In the first embodiment, the net 16 can be raised and lowered in the pit 50, for example way of each of the anchoring brackets 20 being mounted in, or otherwise associated with, guides or tracks 54, so that the anchoring brackets can be moved upwardly and downwardly along the walls 52 by way of a system of motor-driven winches 56 and cables 58 and/or other suitable systems. Each cable 58 extends from, can be let out from, and wound into, the respective winch 56. Optionally, the cavity of the pit 50 can contain water, and an upper surface of the water is schematically designated by wavy line 62 in FIG. 2.

Examples of methods are described in the following, in accordance with the first embodiment. For assembling the energy absorber 14, the flexible tensile member 18 can initially be inserted through the openings, guideways, and/or passageways defined through the guide tubes 28 of numerous brackets 24. Either before or after insertion of the flexible tensile member 18 through the guide tubes 28, the connecters 22 can be assembled by respectively joining the brackets 24 to one another with the fasteners 32, 34. The end terminals 46 can be mounted or otherwise provided on the end sections of the flexible tensile member 18 to restrict the flexible tensile member and guide tubes 28 from becoming separated from one another.

The convolutions 40 can be formed as a result of assembling the connectors 22 and/or guiding the flexible tensile member 18 respectively through the guide tubes 28 of previously assembled connectors 22. Each convolution 22 can be formed in a respective lengthwise section of the flexible tensile member 18, so that along the length of the lengthwise section that at least partially defines the convolution, the lengthwise section includes a central bent section 44 between opposite appendage sections 42, and the opposite appendage sections 42 are held adjacent to one another by the respective connector 22, for example by way of the opposite appendage sections 42 extending through at least one opening of the connector 22. In the first embodiment, the opposite appendage sections 42 respectively extend through the guide tubes 28 of the connector 22. Alternatively, it is believed that the opposite appendage sections 42 may together extend through a single opening of a differently configured connector, for example a one-piece connector, examples of which are discussed below.

At least partially reiterating from above, the connectors 22 are configured to both: restrict straightening of the flexible tensile member's convolute lengthwise sections 40; and automatically reconfigure, in response predetermined tension in the flexible tensile member 18, to allow straightening of the lengthwise sections 40. In the first embodiment, the automatic reconfiguring or releasing by a connector 22, and the associated absorption of energy, comprises the connector's brackets 24 becoming disconnected from one another due to breaking of the associated fasteners 32, 34. In the first embodiment, an energy absorber 14 can be reused multiple times, by reconnecting respective brackets 24 to one another (e.g., replacing broken or otherwise strained fasteners 32, 34).

Figure 13:
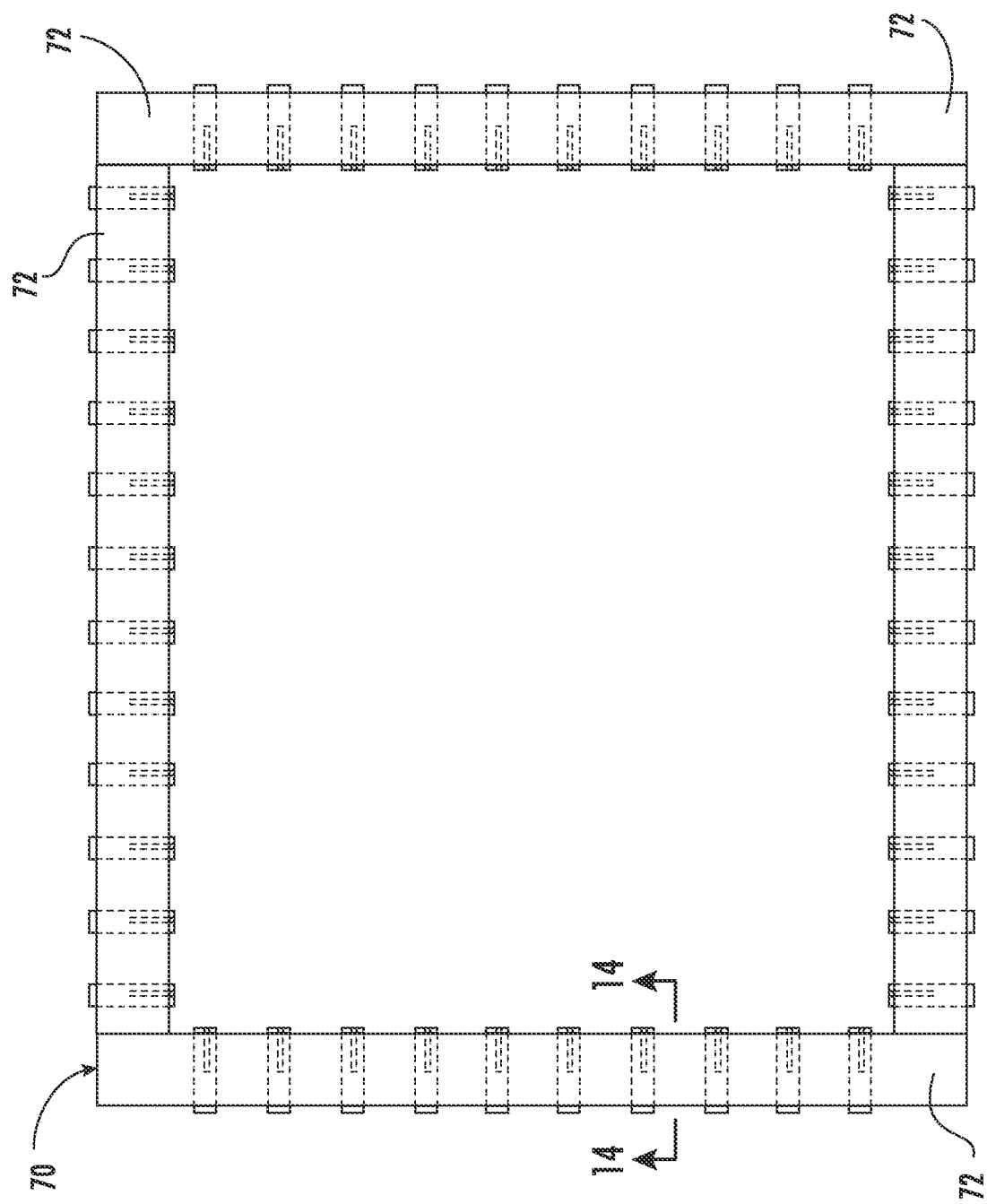
FIG. 13 is a top view of a barge, in accordance with a second embodiment of this disclosure.

The first embodiment and a second embodiment of this disclosure can be alike, except for variations noted and variations that will be apparent to those of ordinary skill in the art. Referring to FIGS. 13 and 15, in the second embodiment arrestor system 12, the motor-driven winches 56 are mounted at least partially around the periphery of a ship that may be in the form of a centrally open barge 70 floating on water 62. For example, the winches 56 can be mounted to upper surfaces of pontoon sections 72, or the like, of the barge 70. Winch-connected lifting cables 74 can extend downwardly through the central opening of the barge 70. Lower central portions of the lifting cables 74 can be connected to an outer marginal portion of (e.g., the periphery of) the lower net 16. Lower ends of the lifting cables 74 can be connected to ballasts 76. The lower net 16 can be held open by a hoop 78 in the form of a flexible fiberglass profile frame, or the like.

Figure 14:
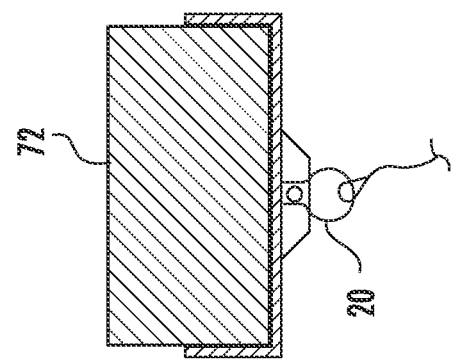
FIG. 14 is a cross-sectional view of a pontoon of the barge taken along line 14-14 of FIG. 13.
Figure 5:
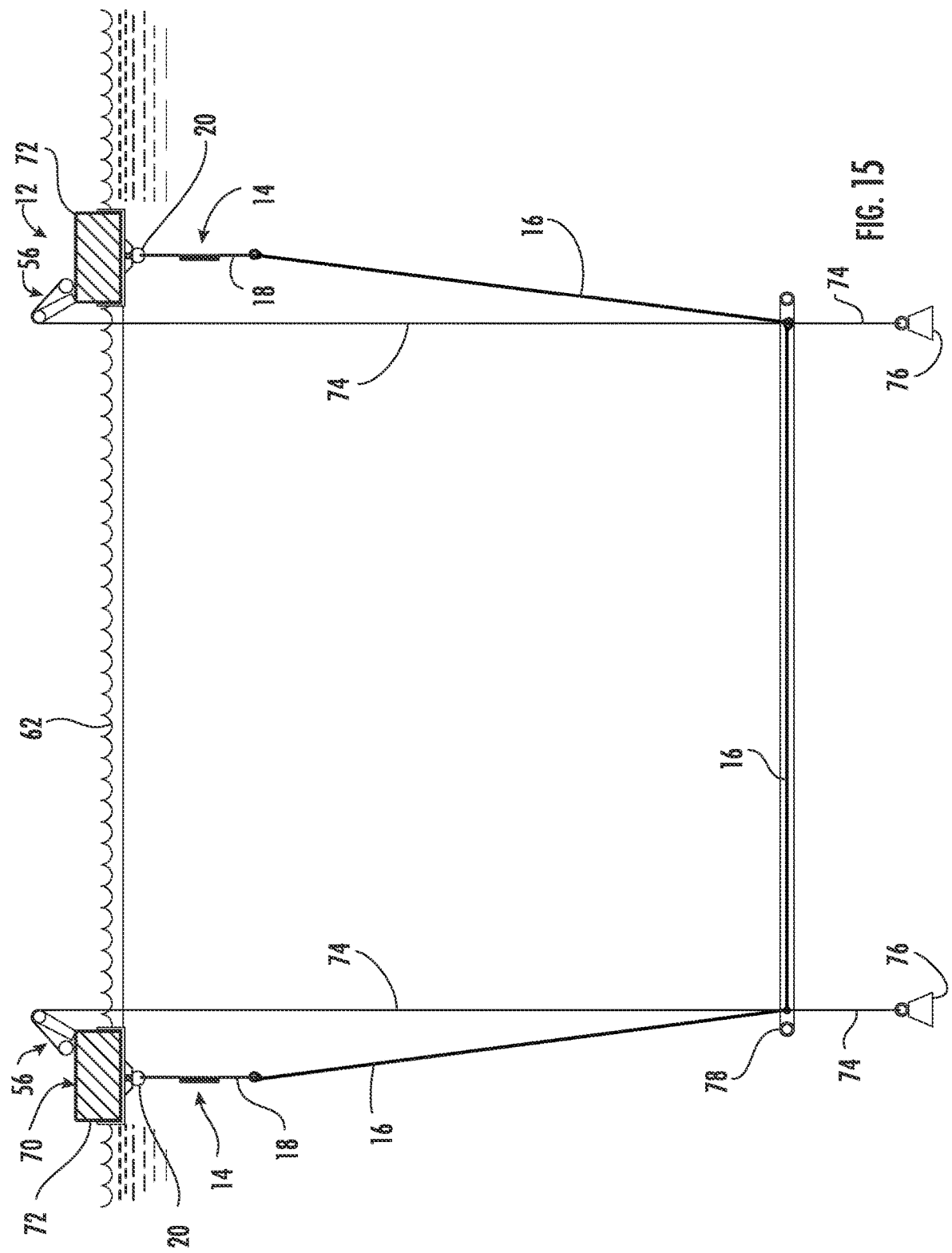

Referring to FIGS. 14 and 15, the upper ends of the energy absorbers 14 (e.g., energy absorbing cables) can be connected to anchoring features 20 (a connector mounted to a reinforcing plate) mounted to lower surfaces of pontoon sections 72 of the barge 70. The lower ends of the energy absorbers 14 can be connected to an outer marginal portion of (e.g., the periphery of) the lower net 16, for example way of side nets 16.

Figure 16:
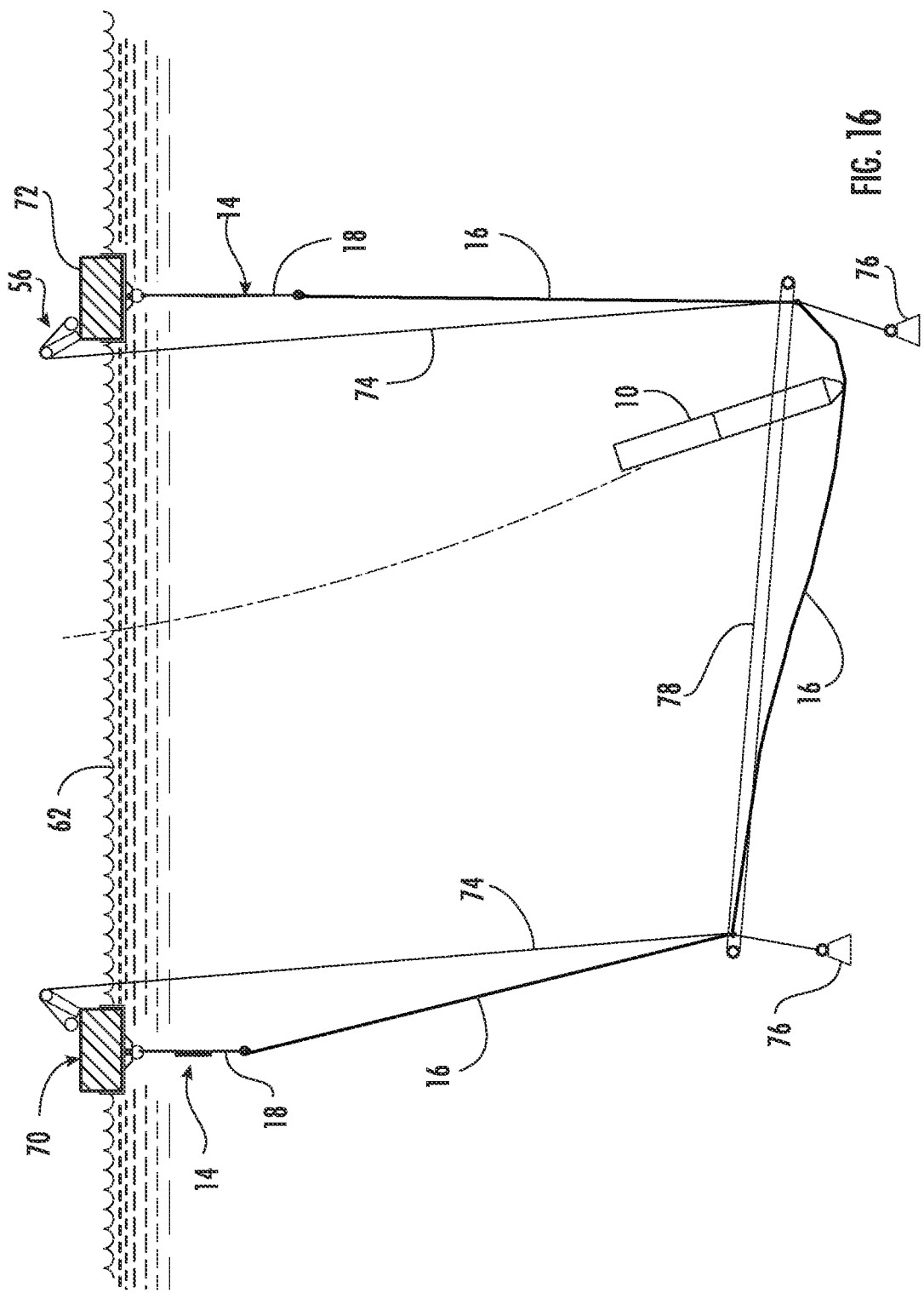
FIG. 16 depicts the arrestor system of FIG. 15 gently catching/relatively slowly decelerating a projectile (e.g., missile).

In FIG. 15, each of the energy absorbers 14 is in its bound or contracted configuration in which respective lengthwise sections of its flexible tensile member 18 are being retained in convolute (e.g., folded 40, doubled over, bent, and/or the like) configurations, so that the energy absorber 14 is capable of absorbing tensile energy over a period of time. Similarly, in FIG. 16, the left energy absorber 14 is in its bound or contracted configuration in which respective lengthwise sections of its flexible tensile member 18 are being retained in convolute configurations. In contrast, in FIG. 16, the right energy absorber 14 is in its fully extended configuration in which the previously existing convolutions in the respective lengthwise sections of its flexible tensile member 18 have been straightened as part of the energy absorber having absorbed a predetermined about of tensile energy while arresting movement of the projectile 10 (e.g., an object that may be in the form of a vehicle, such as a missile).

While arresting movement of the projectile 10, the winches 56 can allow the lifting cables 74 to unreal from the winches with little or no drag. As depicted in FIG. 17, after the arrestor system 12 has caught the projectile 10, the winches 56 can reel in the lifting cables 74 to raise the nets 16.

Figure 19:
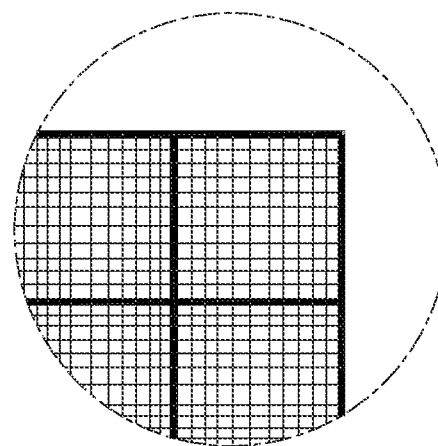
FIG. 19 is an enlarged view of a portion of FIG. 18.
Figure 18:
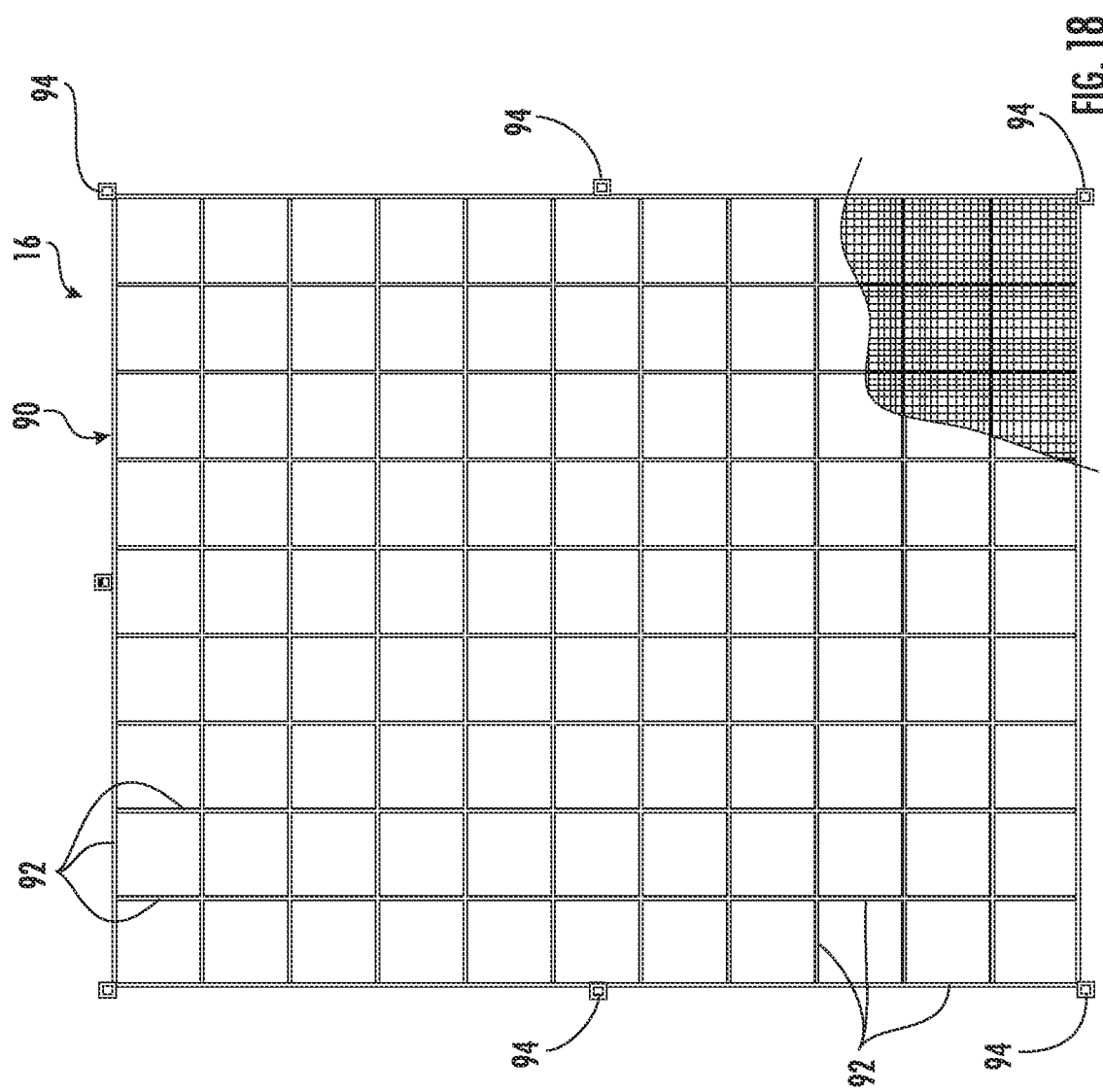
FIG. 18 is an isolated view of a net assembly of the first and second embodiments.
Figure 20:
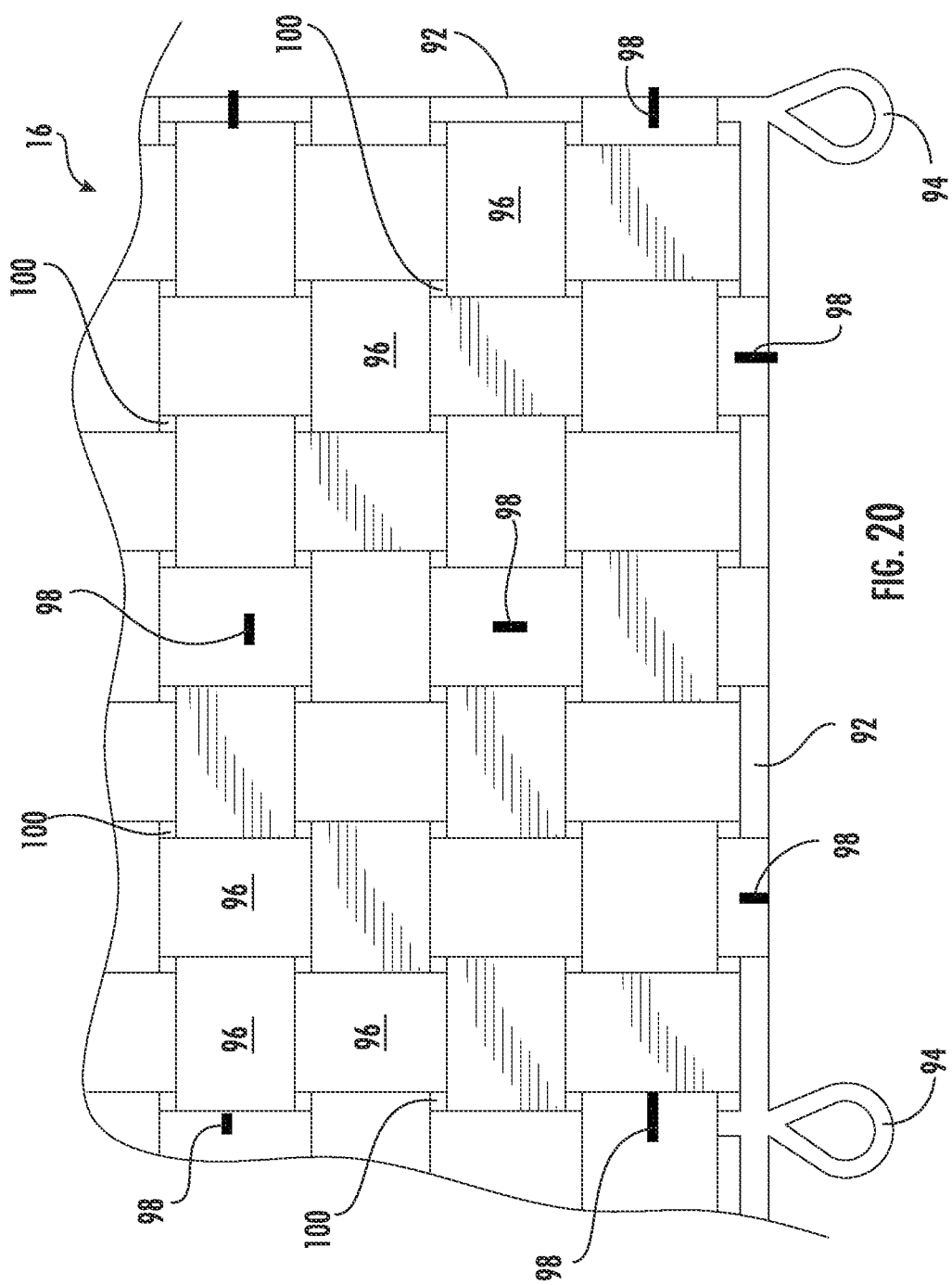
FIG. 20 is a more detailed view of a portion of FIG. 19.

Referring to FIGS. 18-20, for each of the nets 16, the base net structure 90 can be formed from a series of crisscrossed net cables 92 that are respectively connected to one another and define or further include peripheral attachment features 94 (e.g., loops, eyelets, pins, shackles and/or other suitable features for being connected to). Referring to FIG. 20, the nets 16 can further include a woven sheeting cover formed of woven strips 96 of material and attached to the net cables 92 by mechanical fasteners 98 (e.g., clamps, ties, and/or other suitable fasteners). Openings 100 between respective strips 96 can be configured to disrupt laminar flow of water across the surface of the net 16, increasing drag as the net is pushed through water by the projectile 10 (e.g., vehicle or other object). The various cables and strips can be made of pliable material (e.g. Kevlar, nylon, polyester, etc.)

Figure 21:
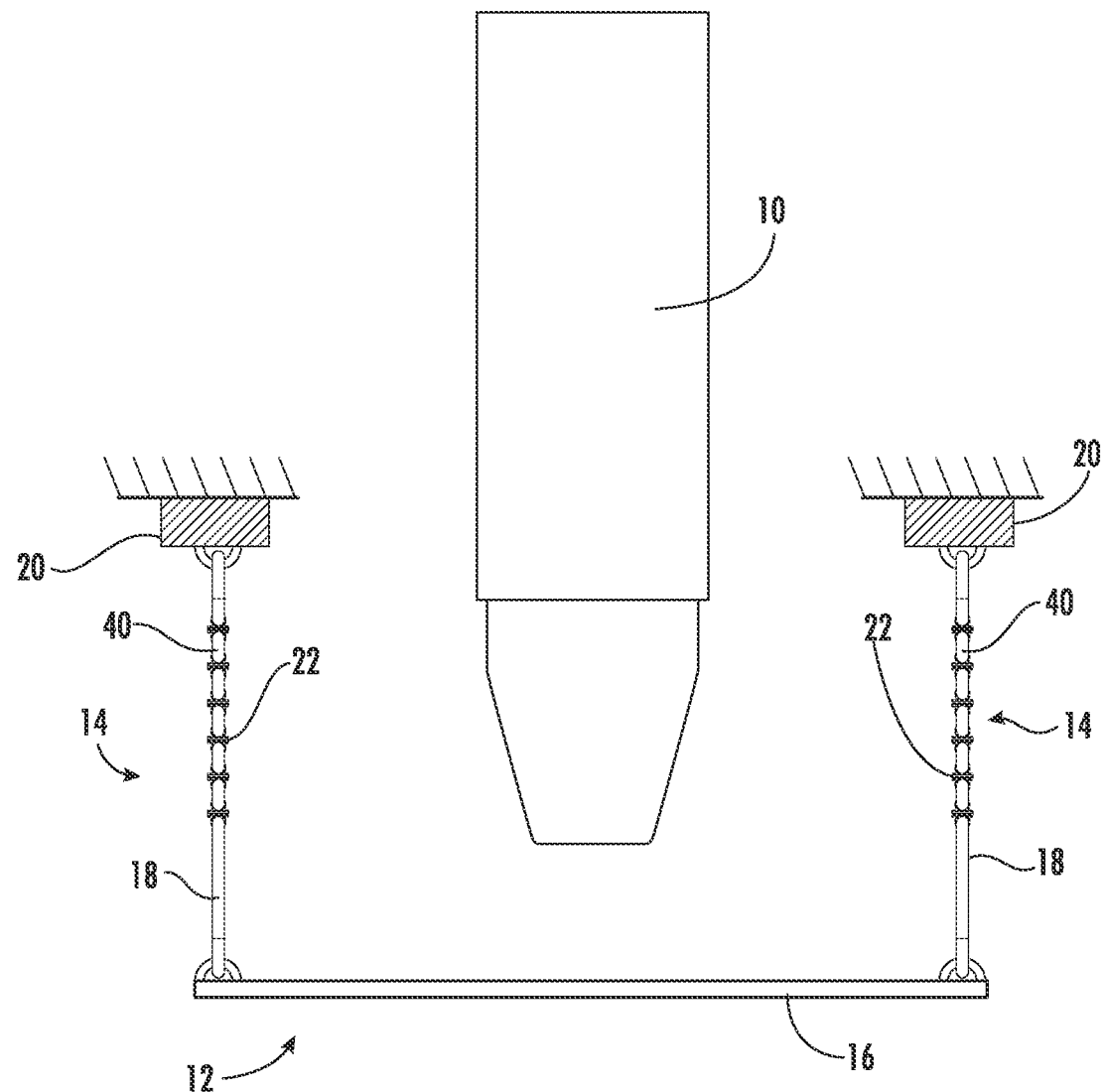
FIG. 21 is a top view depicting a truck traveling toward an arrestor system, in accordance with a third embodiment of this disclosure.

A third embodiment can be like the first and second embodiments, except for variations noted and variations that will be apparent to those of ordinary skill in the art. FIG. 21 illustrates a top view of the third embodiment arrestor system 12 including two energy absorbers 14 extending parallel to each other. The flexible tensile members 18 include a plurality of folded portions 40 joined together by connectors 22. The folded portions 40 are each in a closed configuration. The first end of each flexible tensile member 18 can be attached to a fixed anchoring structure 20. The second end of each flexible tensile 18 member can be attached to an engaging device 16, such as a flexible tensile member, a plurality of flexible tensile members, and/or or a net.

In FIG. 21, a moving object 10 is shown before the object contacts the engaging device 16 at which time tension forces increase on the flexible tensile members 18. Whereas the object 10 is schematically depicted as being a motorized, wheeled vehicle in the form of a truck, the system 12 can arrest movement of a variety of other types of objects such as, but not limited to, other types of vehicles, rail cars, boats, submarines, air born projectiles and/or any other suitable objects.

Typically, the flexible tensile members 18 attached to opposite sides of the engaging device 16 will have the same number of folded portions 40 that have the same lengths. When more than one flexible tensile member 18 is attached to one side of the engaging device 16, the flexible tensile members typically will have the same number of folded portions 40 and the folded portions will have the same lengths. However, the flexible tensile members 18 can have different numbers of folded portions 40 and/or the folded portions can have different lengths. The flexible tensile members 18 can also have different diameters and/or lengths.

Figure 22:
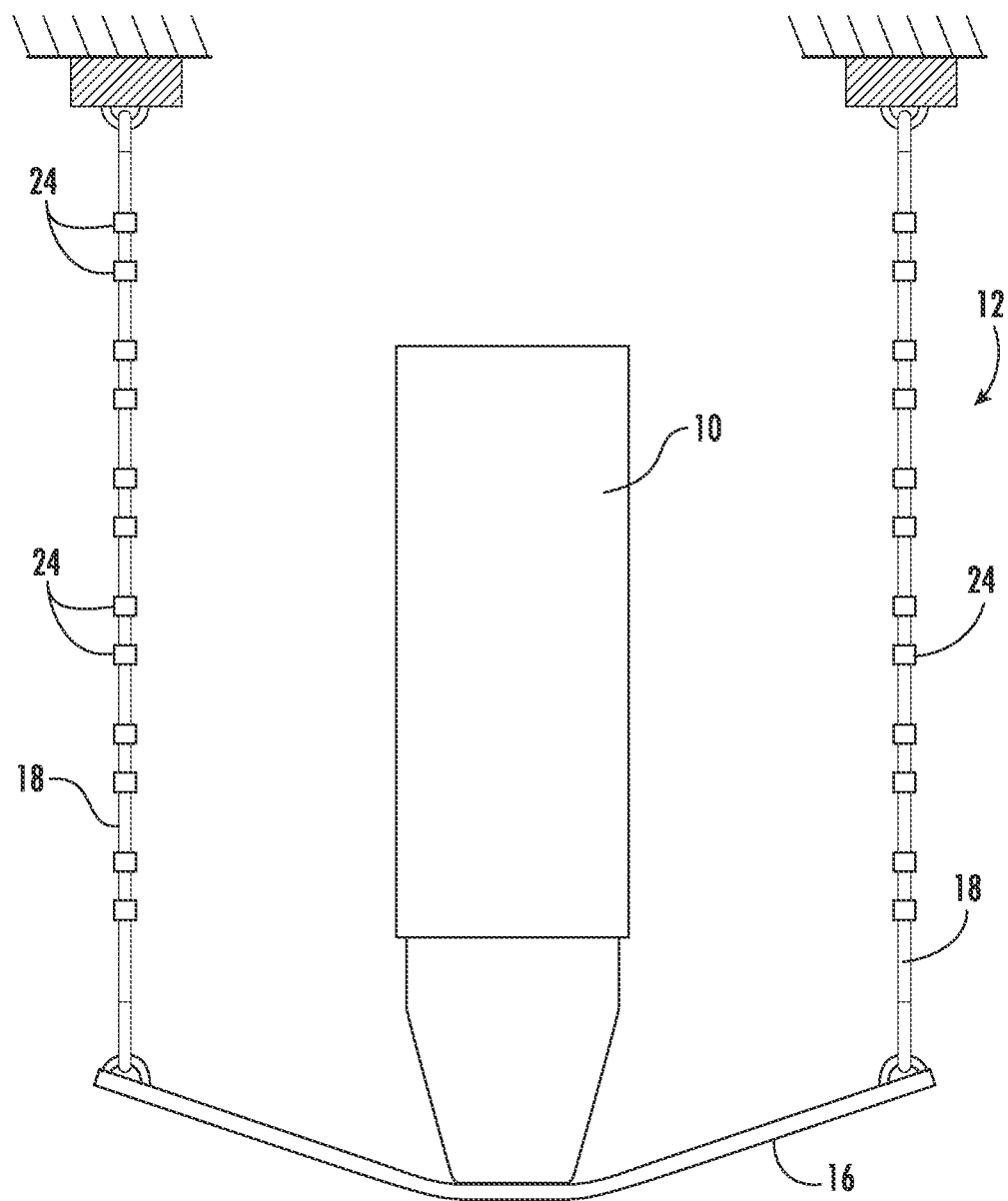
FIG. 22 depicts that the arrestor system of FIG. 21 has arrested forward movement of the truck.

FIG. 22 is a top view of the energy absorber arrestor system 12 shown in FIG. 21 after the moving object 10 has impacted the engaging device 16 and after each of the plurality of folded portions 40 have opened and extended to bring the moving object to rest.

Figure 23:
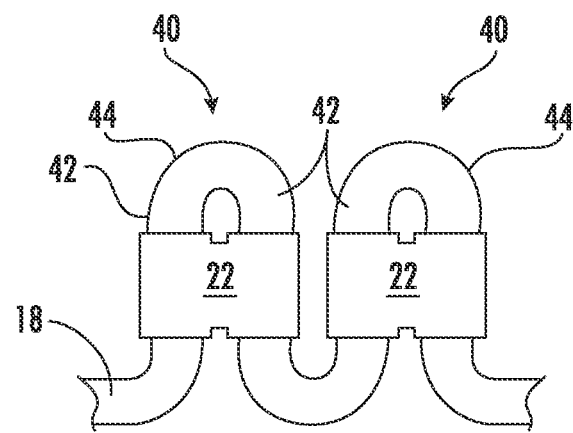
FIG. 23 is a side view of a portion of an energy absorber in accordance with another embodiment of this disclosure.

FIG. 23 is a side view of a section of the flexible tensile member 18 with two one-piece connectors 22 that each break or open to release the folded portions 40 when sufficient tension force is applied to the flexible tensile member. The connectors 22 depicted in FIG. 23 can be a made of rubber, fabric, steel, plastic, wire or other materials. The materials can have a predetermined strength (e.g., tensile strength). The strength (e.g., tensile strength) can be determined as the yield strength, the ultimate strength, and/or the breaking strength. The connectors 22 schematically depicted in FIG. 23 can be ferrules, single barrel crimp sleeves, double barrel crimp sleeves, zip ties, clips, clamps and/or other suitable features. In alternative embodiments of this disclosure, the connectors 22 of the first through third embodiments can be supplemented with and/or replaced by one-piece or other suitable connectors such as, but not limited to, ferrules, single barrel crimp sleeves, double barrel crimp sleeves, zip ties, clips, clamps and/or other suitable features.

The following provides a few brief examples and is not exhaustive, and the present invention is not limited to the following examples.

Example 1. An energy absorber for absorbing tensile energy, the energy absorber comprising: a flexible tensile member comprising a plurality of lengthwise sections arranged serially along a length of the flexible tensile member, wherein for each of first and second lengthwise sections of the plurality of lengthwise sections, at least a portion of the lengthwise section defines a convolution comprising a bend in the lengthwise section; and a plurality of connectors mounted along the length of the tensile member, wherein the plurality of connectors comprises first and second connectors respectively mounted to at least a portion of the first and second lengthwise sections, and wherein for each of the first and second connectors and the first and second lengthwise sections, respectively, the connector is configured to both: restrict straightening of the lengthwise section, and automatically reconfigure, in response predetermined tension in the flexible tensile member, to allow straightening of the lengthwise section.

Example 2. The energy absorber according to Example 1, wherein: along the length of the first lengthwise section of the flexible tensile member, the first lengthwise section comprises a central section between opposite sections of the first lengthwise section; the first lengthwise section's opposite sections are adjacent to one another; and the first connector joins together the first lengthwise section's opposite sections so that the first lengthwise section's central section comprises the bend in the first lengthwise section.

Example 3. The energy absorber according to Example 2, wherein: the first connector comprises a first bracket connected to a second bracket; and the first lengthwise section's opposite sections respectively extend through openings of the first and second brackets.

Example 4. The energy absorber according to Example 1, wherein: along the length of the first lengthwise section of the flexible tensile member, the first lengthwise section comprises a central section between opposite sections; the first lengthwise section's opposite sections are adjacent to one another; the first connector comprises at least one opening through which the end sections extend; and the central section is positioned outwardly of the at least one opening and comprises the bend in the first lengthwise section.

Example 5. The energy absorber according to Example 4, wherein: the first connector comprises a first bracket connected to a second bracket; the at least one opening comprises an opening of the first bracket and an opening of the second bracket; and the first lengthwise section's opposite sections respectively extend through the openings of the first and second brackets.

Example 6. The energy absorber according to Example 5, wherein: the first connector comprises a fastener connecting the first bracket to the second bracket; and the first connector being configured to automatically reconfigure is comprised of the fastener being configured to break in response predetermined tension in the flexible tensile member, to allow straightening of the first lengthwise section.

Example 7. The energy absorber according to Example 1, comprising a end terminal, wherein: an end section of the flexible tensile member is terminated with the end terminal; the first connector comprises a bracket comprising an opening through which the flexible tensile member extends; and the opening has a crosswise dimension that is smaller than a crosswise dimension of the end terminal so that the bracket restricts the end terminal from passing through the opening.

Example 8. The energy absorber according to Example 1, wherein: at least a portion of the first connector has a strength that is less than tensile yield strength of the flexible tensile member, and at least a portion of the second connector has a strength that is less than tensile yield strength of the flexible tensile member.

Example 9. The energy absorber according to Example 8, wherein the strength of the at least the portion of the first connector is about the same as the strength of the at least the portion of the second connector.

Example 10. The energy absorber according to Example 8, wherein: the at least the portion of the first connector comprises a fastener having a tensile breaking strength that is less than the tensile yield strength of the flexible tensile member, and the at least the portion of the second connector comprises a fastener having a tensile breaking strength that is less than the tensile yield strength of the flexible tensile member.

Example 11. The energy absorber according to Example 10, further comprising a flexible sleeve having a length and defining an elongate interior space, wherein: a length of the energy absorber extends within the sleeve and along the length of the sleeve, the at least the portions of the first and second connectors are configured to fragment in response to the predetermined tension in the flexible tensile member, and the sleeve is configured to at least partially retain at least some of the fragments in the interior space.

Example 12. The energy absorber according to Example 10, wherein: the energy absorber is elongate, the elongate energy absorber is in combination with a structural engaging device, and the structural engaging device is connected to an end section of the elongate energy absorber and configured to extend across an area and obstruct passage through the area.

Example 13. The energy absorber according to Example 10, wherein the engaging device comprises a net.

Example 14. A system for gradually arresting movement of an object, the system comprising: first and second energy absorbers each comprising a flexible tensile member comprising a plurality of lengthwise sections that are arranged serially along a length of the flexible tensile member, wherein for each of first and second lengthwise sections of the plurality of lengthwise sections, the lengthwise section at least partially defines a convolution comprising a bend in the lengthwise section, and a plurality of connectors mounted along the length of the tensile member, wherein the plurality of connectors comprises first and second connectors respectively mounted to the first and second lengthwise sections, and wherein for each of the first and second connectors and the first and second lengthwise sections, the connector is configured to both: restrict straightening of the lengthwise section, and automatically reconfigure, in response predetermined tension in the flexible tensile member, to allow straightening of the lengthwise section; and a structural engaging device having a central area positioned between opposite sections of the structural object, wherein the opposite sections of the structural object are respectively connected to end sections of the first and second energy absorbers, and the central area of the structural engaging device is configured to extend across an area and obstruct passage through the area.

Example 15. The system according to Example 14, wherein the structural engaging device comprises a net.

Example 16. A method of gradually arresting movement of a moving object, the method comprising: operatively associating the moving object with an energy absorber, wherein the energy absorber comprises a flexible tensile member, and the flexible tensile member comprises a plurality of lengthwise sections arranged serially along a length of the flexible tensile member, and wherein for each of first and second lengthwise sections of the plurality of lengthwise sections, the lengthwise section at least partially defines a convolution comprising a bend in the lengthwise section; and the flexible tensile member experiencing cyclic tensioning while the moving object remains operatively associated with the energy absorber and continues to straighten the flexible tensile member, the cyclic tensioning comprising the flexible tensile member experiencing a first increase in tension, then the flexible tensile member experiencing a first decrease in tension during straightening of the first lengthwise section of the flexible tensile member, then the flexible tensile member experiencing a second increase in tension, and then the flexible tensile member experiencing a second decrease in tension during straightening of the second lengthwise section of the flexible tensile member.

Example 17. The method according to Example 16, comprising: any straightening of the first lengthwise section being restricted while the flexible tensile member experiences the first increase in tension; then the flexible tensile member experiencing the first decrease in tension in response to a first automatic reconfiguring; any straightening of the second lengthwise section being restricted while the flexible tensile member experiences the second increase in tension; and then the flexible tensile member experiencing the second decrease in tension in response to a second automatic reconfiguring.

First Example 18. The method according to Example 17, wherein the first automatic reconfiguring is comprised of breaking a fastener connecting parts of a connector.

Second Example 18. The method according to claim 17, wherein: the first automatic reconfiguring occurs in response to tension in the flexible tensile member; and the tension in the flexible tensile member does not reach tensile yield strength of the flexible tensile member during the first automatic reconfiguring.

Example 19. A method of at least partially assembling an energy absorber, the method comprising: having a flexible tensile member comprising a plurality of lengthwise sections arranged serially along a length of the flexible tensile member; securing a first convolution in a first lengthwise section of the plurality of lengthwise sections, wherein: the first convolution comprises a bend in the first lengthwise section, along the length of the first lengthwise section of the flexible tensile member, the first lengthwise section comprises a central section between opposite sections, the securing of the first convolution in the first lengthwise section is comprised of attaching at least one fastener to hold the first lengthwise section's opposite sections adjacent to one another; and securing a second convolution in a second lengthwise section of the plurality of lengthwise sections, wherein: the second convolution comprises a bend in the second lengthwise section, along the length of the second lengthwise section of the flexible tensile member, the second lengthwise section comprises a central section between opposite sections, and the securing of the second convolution in the second lengthwise section is comprised of attaching at least one fastener to hold the second lengthwise section's opposite sections adjacent to one another.

Example 20. The method of Example 19, further comprising, after straightening of the bend in the first lengthwise section: forming a subsequent convolution in the first lengthwise section of the plurality of lengthwise sections, comprising arranging the first lengthwise section's opposite sections adjacent to one another to form a subsequent bend in the first lengthwise section; and attaching at least one fastener to hold the first lengthwise section's opposite sections adjacent to one another.

Reiterating from above, it is within the scope of this disclosure for one or more of the terms "substantially," "about," "approximately," and/or the like, to qualify each of the adjectives and adverbs of the foregoing disclosure, for the purpose of providing a broad disclosure. As an example, it is believed that those of ordinary skill in the art will readily understand that, in different implementations of the features of this disclosure, reasonably different engineering tolerances, precision, and/or accuracy may be applicable and suitable for obtaining the desired result. Accordingly, it is believed that those of ordinary skill will readily understand usage herein of the terms such as "substantially," "about," "approximately," and the like.

In the specification and drawings, examples of embodiments have been disclosed. The present invention is not limited to such exemplary embodiments. The use of the term "and/or" includes any and all combinations of one or more of the associated listed items. Unless otherwise noted, specific terms have been used in a generic and descriptive sense and not for purposes of limitation.

The invention claimed is:

1. An energy absorber for absorbing tensile energy, the energy absorber comprising:
   a flexible tensile member comprising a plurality of lengthwise sections arranged serially along a length of the flexible tensile member, wherein:
       along the length of the flexible tensile member, a first lengthwise section of the plurality of lengthwise sections is followed by a second lengthwise section of the plurality of lengthwise sections,
       along a length of the first lengthwise section, the first lengthwise section comprises a bend between opposite sections of the first lengthwise section,
       the first lengthwise section's opposite sections are adjacent to one another,
       along a length of the second lengthwise section, the second lengthwise section comprises a bend between opposite sections of the second lengthwise section,
       the second lengthwise section's opposite sections are adjacent to one another, and
       the first lengthwise section's bend and the second lengthwise section's bend are spaced apart from one another along the length of the flexible tensile member;
   first and second tubes, wherein the first lengthwise section's opposite sections respectively extend through the first and second tubes so that each of the first and second tubes extends completely around the flexible tensile member;
   at least one connection between the first and second tubes is configured to both:
       restrict straightening of the first lengthwise section by restricting relative movement between the first and second tubes, and
       automatically reconfigure, in response to predetermined tension in the flexible tensile member, to allow straightening of the first lengthwise section's bend by allowing relative movement between the first and second tubes;
   third and fourth tubes, wherein the second lengthwise section's opposite sections respectively extend through the third and fourth tubes so that each of the third and fourth tubes extends completely around the flexible tensile member; and
   at least one connection between the third and fourth tubes is configured to both:
       restrict straightening of the second lengthwise section by restricting relative movement between the third and fourth tubes, and
       automatically reconfigure, in response to predetermined tension in the flexible tensile member, to allow straightening of the second lengthwise section's bend by allowing relative movement between the third and fourth tubes.

2. The energy absorber according to claim 1, wherein the first lengthwise section's bend is positioned outside of the first and second tubes.

3. The energy absorber according to claim 1, wherein the at least one connection between the first and second tubes is configured to break in response to predetermined tension in the flexible tensile member.

4. The energy absorber according to claim 1, wherein:
the at least one connection between the first and second tubes comprises a connector; and
the connector is configured to break in response to predetermined tension in the flexible tensile member.

5. The energy absorber according to claim 1, wherein:
the at least one connection between the first and second tubes comprises at least one bolt; and
the at least one bolt is configured to break in response to predetermined tension in the flexible tensile member.

6. The energy absorber according to claim 1, wherein:
the at least one connection between the first and second tubes comprises a plurality of fasteners;
the plurality of fasteners are configured to break in response to predetermined tension in the flexible tensile member; and
first and second fasteners of the plurality of fasteners are arranged in parallel with respect to one another.

7. A system comprising the energy absorber according to claim 1, wherein:
the energy absorber is a first energy absorber;
the system comprises a second energy absorber, and a structural engaging device;
opposite sections of the structural engaging device are respectively connected to the first and second energy absorbers; and
the structural engaging device is configured to extend across an area and obstruct passage through the area.

8. The system according to claim 7, wherein the structural engaging device is suspended by way of at least the first and second energy absorbers.

9. A method of gradually arresting movement of a moving object using the system of claim 8, the method comprising:
at least a portion of the structural engaging device being positioned in water beneath an upper surface of the water;
the object falling into the water and then engaging and applying force against at least the portion of the structural engaging device; and
the at least one connection between the first and second tubes automatically reconfiguring in response to the object applying force against at least the portion of the structural engaging device.

10. An energy absorber according to claim 1, wherein:
the flexible tensile member is a cable having an outer diameter;
the first tube has an inner diameter that is larger than the outer diameter of the cable;
the second tube has an inner diameter that is larger than the outer diameter of the cable;
the third tube has an inner diameter that is larger than the outer diameter of the cable; and
the fourth tube has an inner diameter that is larger than the outer diameter of the cable.

11. An energy absorbing system configured to engage a descending object and arrest movement of the object, the system comprising:
a plurality of anchoring structures extending at least partially around an area;
a structural engaging device suspended from the plurality of anchoring structures, comprising a plurality of energy absorbers respectively connected between the anchoring structures and the structural engaging device so that the plurality of energy absorbers at least partially support the structural engaging device and the structural engaging device is configured to engage and at least partially move with a descending object; and
at least one winch operatively connected to the structural engaging device via cabling, wherein the at least one winch is configured to raise and lower the structural engaging device,
wherein an energy absorber of the plurality of energy absorbers comprises a flexible tensile member comprising a lengthwise section,
along a length of the lengthwise section, the lengthwise section comprises a bend between opposite sections of the lengthwise section,
the lengthwise section's opposite sections are adjacent to one another and respectively extend through guides,
at least one connection between the guides is configured to both:
restrict straightening of the lengthwise section by restricting relative movement between the guides, and
automatically reconfigure, in response to predetermined tension in the flexible tensile member, to allow straightening of the lengthwise section by allowing relative movement between the guides, and
the plurality of anchoring structures are supported by at least one object configured to float on water.

12. The system according to claim 11, wherein the structural engaging device comprises a net.

13. An energy absorbing system configured to engage a descending object and arrest movement of the object, the system comprising:
a plurality of anchoring structures extending at least partially around an area;
a structural engaging device suspended from the plurality of anchoring structures, comprising a plurality of energy absorbers respectively connected between the anchoring structures and the structural engaging device so that the plurality of energy absorbers at least partially support the structural engaging device and the structural engaging device is configured to engage and at least partially move with a descending object; and
at least one winch operatively connected to the structural engaging device via cabling, wherein the at least one winch is configured to raise and lower the structural engaging device,
wherein an energy absorber of the plurality of energy absorbers comprises a flexible tensile member comprising a lengthwise section,
along a length of the lengthwise section, the lengthwise section comprises a bend between opposite sections of the lengthwise section,
the lengthwise section's opposite sections are adjacent to one another and respectively extend through guides,
at least one connection between the guides is configured to both:
restrict straightening of the lengthwise section by restricting relative movement between the guides, and
automatically reconfigure, in response to predetermined tension in the flexible tensile member, to allow straightening of the lengthwise section by allowing relative movement between the guides, and
the cabling comprises a lower end connected to ballast.

14. An energy absorbing system configured to engage a descending object and arrest movement of the object, the system comprising:

a plurality of anchoring structures extending at least partially around an area;

a structural engaging device suspended from the plurality of anchoring structures, comprising a plurality of energy absorbers respectively connected between the anchoring structures and the structural engaging device so that the plurality of energy absorbers at least partially support the structural engaging device and the structural engaging device is configured to engage and at least partially move with a descending object; and a cavity configured to contain water, wherein the structural engaging device is positioned in the cavity, wherein an energy absorber of the plurality of energy absorbers comprises a flexible tensile member comprising a lengthwise section, along a length of the lengthwise section, the lengthwise section comprises a bend between opposite sections of the lengthwise section, the lengthwise section's opposite sections are adjacent to one another and respectively extend through guides, and at least one connection between the guides is configured to both:
- restrict straightening of the lengthwise section by restricting relative movement between the guides, and
- automatically reconfigure, in response to predetermined tension in the flexible tensile member, to allow straightening of the lengthwise section by allowing relative movement between the guides.

15. The system according to claim 14, wherein the plurality of anchoring structures are respectively movably mounted for traveling upwardly and downwardly along the cavity.

16. The system according to claim 15, comprising at least one winch operatively connected to the anchoring structures via cabling, wherein the at least one winch is configured to raise and lower the structural engaging device within the cavity.

17. An energy absorber for absorbing tensile energy, the energy absorber comprising:

a flexible tensile member, wherein a lengthwise section of the flexible tensile member extends along a length of the flexible tensile member, and the lengthwise section comprises a bend between opposite sections of the lengthwise section;

a first article comprising a first base connected to a first tube;

a second article comprising a second base connected to a second tube, wherein the lengthwise section's opposite sections respectively extend through the first and second tubes; and a plurality of connections between the first and second bases is configured to restrict straightening of the lengthwise section by restricting relative movement between the first and second articles, wherein first and second connections of the plurality of connections are arranged in parallel with respect to one another, and the plurality of connections is configured to both:
- restrict straightening of the lengthwise section by restricting relative movement between the first and second articles, and
- break in response to predetermined tension in the flexible tensile member, to allow straightening of the lengthwise section's bend by allowing relative movement between the first and second articles.

18. The energy absorber according to claim 17, wherein:

the first base comprises a first plate defining first and second holes that are spaced apart from one another;

the second base comprises a second plate defining first and second holes that are spaced apart from one another;

the first connection comprises a fastener extending through both:
- the first hole of the first plate, and
- the first hole of the second plate; and the second connection comprises a fastener extending through both:
- the second hole of the first plate, and
- the second hole of the second plate.

19. The energy absorber according to claim 18, wherein:

the fastener of the first connection comprises a bolt; and the fastener of the second connection comprises another bolt.

20. An energy absorber according to claim 18, wherein:

the flexible tensile member is a cable having an outer diameter, and each of the first, second, third, and fourth tubes both:
- extends completely around the cable, and
- has an inner diameter that is larger than the outer diameter of the cable.

* * * * *